United States Patent
Yang et al.

(10) Patent No.: US 11,696,303 B2
(45) Date of Patent: *Jul. 4, 2023

(54) SERVICE TRANSMISSION METHOD, BASE STATION, AND TERMINAL

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 95 days.

This patent is subject to a terminal disclaimer.

(21) Appl. No.: 17/333,942

(22) Filed: May 28, 2021

(65) Prior Publication Data

US 2021/0289538 A1 Sep. 16, 2021

Related U.S. Application Data

(63) Continuation of application No. 16/476,073, filed as application No. PCT/CN2017/070482 on Jan. 6, 2017, now Pat. No. 11,284,427.

(51) Int. Cl.
*H04W 72/23* (2023.01)
*H04W 48/12* (2009.01)
(Continued)

(52) U.S. Cl.
CPC ........... *H04W 72/23* (2023.01); *H04W 48/12* (2013.01); *H04W 72/0446* (2013.01); *H04W 72/0453* (2013.01)

(58) Field of Classification Search
CPC .... H04B 1/76; H04W 48/12; H04W 52/0235; H04W 72/042; H04W 72/0446;
(Continued)

(56) References Cited

U.S. PATENT DOCUMENTS

| 9,408,190 B2 * | 8/2016 | Pan ........................ H04L 1/0091 |
| 2013/0083753 A1 | 4/2013 | Lee et al. |

(Continued)

FOREIGN PATENT DOCUMENTS

| CL | 201901830 | 10/2019 |
| CN | 103327552 A | 9/2013 |

(Continued)

OTHER PUBLICATIONS

Australian Examination Report for AU Application 2017391825 dated Mach 10, 2022. (4 pages).

(Continued)

*Primary Examiner* — Thomas R Cairns
(74) *Attorney, Agent, or Firm* — Young Basile Hanlon & MacFarlane, P.C.

(57) ABSTRACT

A service transmission method, a base station and a terminal are provided. The method includes: a base station sends a switch message of a narrow bandwidth receiving mode to a terminal, indicating the terminal to switch to a designated narrow bandwidth to receive information, wherein a width of the narrow bandwidth is smaller than a width of a system bandwidth; and when a pre-scheduled service needs to be transmitted, the base station schedules the terminal to switch to the system bandwidth or the bandwidth occupied by the pre-scheduled service to receive the pre-scheduled service.

18 Claims, 9 Drawing Sheets

(51) Int. Cl.
*H04W 72/0446* (2023.01)
*H04W 72/0453* (2023.01)

(58) Field of Classification Search
CPC ......... H04W 72/0453; H04W 72/0493; H04W 72/044; H04W 72/1289; H04W 72/1294; H04W 72/14; H04W 74/0866; H04W 72/0457; H04W 72/23–232; H04W 72/53; Y02D 30/70
See application file for complete search history.

(56) References Cited

U.S. PATENT DOCUMENTS

| | | | |
|---|---|---|---|
| 2013/0244666 A1 | 9/2013 | Carmon et al. | |
| 2014/0192733 A1 | 7/2014 | Charbit et al. | |
| 2016/0088592 A1 | 3/2016 | Montojo et al. | |
| 2016/0127991 A1* | 5/2016 | Ang | H04L 1/0018 455/522 |
| 2016/0309282 A1 | 10/2016 | Xu et al. | |
| 2018/0092095 A1 | 3/2018 | Zeng et al. | |

FOREIGN PATENT DOCUMENTS

| | | |
|---|---|---|
| CN | 103828457 A | 5/2014 |
| CN | 103999528 A | 8/2014 |
| CN | 104321985 A | 1/2015 |
| JP | 2011511528 A | 4/2011 |
| JP | 2016021702 A | 2/2016 |
| RU | 2563589 C2 | 9/2015 |
| WO | 2016047729 A1 | 3/2016 |

OTHER PUBLICATIONS

Huawei, 'Energy saving techniques to support low load scenarios'; San Francisco, USA, Feb. 22-26, 2010.
3 GPP TSG RAN WG1 Meeting #87; R1-1611655; Reno, USA, Nov. 14-18, 2016.
EP Search Report for Application No. 17890128.6 dated Nov. 18, 2019.
Canadian Office Action for CA Application 3,049,280 dated Aug. 12, 2020.
English translation of Chile Office Action for CL Application 201901868 dated Jul. 14, 2020.
English translation of Russia Office Action for RU Application 2019124287 dated Jun. 18, 2020.
Japan Office Action with English Translation for JP Application 2019536895 dated Dec. 9, 2020.
3GPP TSG RAN WG1 Meeting #87; Reno, USA, Nov. 14-18, 2016; R1-1611211.
Indian First Examination Report for IN Application 201917028713 dated Oct. 21, 2020.
Chile Second Office Action with English Translation for CL Application 2019-001868 dated Nov. 12, 2020.
Canadian Notice of Allowance for CA Application 3049280 dated May 18, 2021. (1 page).
Japanese Notice of Allowance with English Translation for JP Application 2010536895 dated Mar. 30, 2021. (5 pages).
International Search Report with English Translation for International Application PCT/CN2017/070482 dated Oct. 11, 2017. (6 pages).
Australian Examination Report for AU Application 2017391825 dated Sep. 24, 2021. (4 pages).
Communication pursuant to Article 94(3) EPC for EP Application 17890128.6 dated Jul. 13, 2021. (5 pages).
Indonesia Office Action with English Translation for ID Application P00201906735 dated Jul. 30, 2021. (4 pages).
Israel Office Action with English Translation for IL Application 267826 dated Aug. 1, 2021. (6 pages).
Taiwan Office Action with English Translation for TW Application 106146416 dated Aug. 31, 2021. (16pages).
Chinese First Office Action with English Translation for CN Application 201780082394.1 dated Oct. 31, 2022. (11 pages).
Mexican First Substantive Examination requirement is reported with English Translation for MX Application MXa201 9008077 dated Nov. 4, 2022. (7 pages).

* cited by examiner

SERVICE TRANSMISSION METHOD, BASE STATION, AND TERMINAL

CROSS-REFERENCE TO RELATED APPLICATION(S)

This application is a continuation application of U.S. application Ser. No. 16/476,073, which is a 371 application of International Application No. PCT/CN2017/070482, filed on Jan. 6, 2017, the entire disclosure of both applications are hereby incorporated by reference.

TECHNICAL FIELD

The present disclosure relates to the technical field of communications, in particular to a method for transmitting a service, a base station and a terminal.

BACKGROUND

In a Long Term Evolution (LTE) system, a terminal receives a downlink signal on a whole system bandwidth. The downlink signal includes a Physical Downlink Control Channel (PDCCH) and a downlink common reference signal, such as a Cell-specific Reference Signal (CRS), and a Channel State Information Reference Signal (CSI-RS). The system bandwidths supported by the LTE system include 1.4 MHz, 3 MHz, 5 MHz, 10 MHz, 15 MHz and 20 MHz. Among the system bandwidths, system bandwidths of 20 MHz and 10 MHz are typical and widely used. For the downlink channel, the system bandwidths of 20 MHz and 10 MHz correspond to 100 Physical Resource Blocks (PRBs) and 50 PRBs respectively.

In the existing LTE system, the terminal always performs blind detection of PDCCH on the whole downlink system bandwidth, which leads to a high power consumption of the terminal. Especially in a system of 5-Generation (5G) mobile communication technology and a system of future mobile communication technology with a large bandwidth, a bandwidth of a carrier may be very wide, for example up to 200 MHz. If the terminal still receives PDCCH on the whole bandwidth as that in the LTE system, i.e. a system of 4-generation (4G) mobile communication technology, then the power consumption of the terminal will be very high. For a terminal supporting Machine Type Machine (MTC), downlink signals can be demodulated on the system bandwidth of 1.4 MHz, that is, 6 PRBs. For such type of the terminal, the power consumption of the terminal can be saved due to the reduction of the downlink bandwidth. However, since such type of the terminal can only work on a narrower bandwidth, such as 6 PRBs, functions of the terminal will be greatly restricted. Data scheduled on the system bandwidth cannot be received under the narrower bandwidth. Some pre-scheduled services, such as a high definition voice (VoLTE) service, are transmitted on the system bandwidth in a way of Semi-Persistent Scheduling (SPS). For such pre-scheduled service, a base station indicates the terminal of current scheduling information through a PDCCH in an initial scheduling. When the terminal identifies it as the Semi-Persistent Scheduling, the current scheduling information is saved, and the service data are sent or received on same time-frequency resource locations at every fixed cycle. If the terminal receives a signal on the narrower bandwidth, there is a great restriction on the system performance, and the transmission of the pre-scheduled service may not be accomplished.

SUMMARY

Implementations of the disclosure provide a method for transmitting a service method, a base station and a terminal.

A first aspect of an implementation of the present disclosure provides a method for transmitting a service. The method includes: a base station sends a switch message of a narrow bandwidth receiving mode to a terminal, indicating the terminal to switch to a designated narrow bandwidth to receive information, wherein a width of the narrow bandwidth is smaller than a width of a system bandwidth; and the base station schedules the terminal to switch to the system bandwidth or a bandwidth occupied by a pre-scheduled service to receive the pre-scheduled service when the pre-scheduled service needs to be transmitted.

In a possible implementation, the method further includes: sending downlink control information for the terminal in a physical downlink control channel on the narrow bandwidth; wherein the downlink control information is in a terminal-specific search space corresponding to the terminal, and uses a control-channel element aggregation level corresponding to the terminal.

In a possible implementation, before the base station sends the switch message of the narrow bandwidth receiving mode to the terminal, indicating the terminal to switch to the designated narrow bandwidth to receive the information, the method further includes: the base station sends information relevant to the pre-scheduled service to the terminal, wherein the information relevant to the pre-scheduled service includes process identification information of the pre-scheduled service, periodic information of the pre-scheduled service, and information of a resource allocated by the base station for the pre-scheduled service.

In a possible implementation, scheduling, by the base station, the terminal to switch to the system bandwidth or the bandwidth occupied by the pre-scheduled service to receive the pre-scheduled service when the pre-scheduled service needs to be transmitted, includes: the base station configures information of time interval during which the terminal is in the narrow bandwidth receiving mode, and information of a time-period during which the terminal receives the pre-scheduled service, and sends the information of the time-period during which the terminal is in the narrow bandwidth receiving mode and the information of the time-period during which the terminal receives the pre-scheduled service to the terminal; the base station schedules the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

In a possible implementation, scheduling, by the base station, the terminal to switch to the system bandwidth or the bandwidth occupied by the pre-scheduled service to receive the pre-scheduled service when the pre-scheduled service needs to be transmitted, includes: configuring, according to the periodic information of the pre-scheduled service, the terminal that is in the narrow bandwidth receiving mode to switch to the system bandwidth or the bandwidth occupied by the pre-scheduled service according to a time interval to receive the pre-scheduled service.

In a possible implementation, scheduling, by the base station, the terminal to switch to the system bandwidth or the bandwidth occupied by the pre-scheduled service to receive the pre-scheduled service when the pre-scheduled service needs to be transmitted, includes: the base station sends a process identification of the pre-scheduled service and first time information of when the terminal switches to the system bandwidth or the bandwidth occupied by the pre-scheduled service, in downlink control information of a physical downlink control channel of the narrow bandwidth, wherein the downlink control information is used for triggering the terminal to switch to the system bandwidth or the bandwidth occupied by the pre-scheduled service; sends second time information of when the terminal returns to the narrow bandwidth receiving mode in the downlink control information, or transmits a trigger signal for triggering the terminal to return to the narrow bandwidth receiving mode in a preset area of a physical downlink control channel of the system bandwidth; schedules the terminal to switch to the system bandwidth or the bandwidth occupied by the pre-scheduled service to receive the pre-scheduled service according to the first time information and the second time information, or according to the first time information and the trigger signal.

In a possible implementation, if the bandwidth occupied by the pre-scheduled service is the system bandwidth, the base station schedules the terminal to switch to the system bandwidth to receive the pre-scheduled service when the pre-scheduled service needs to be transmitted.

If the bandwidth occupied by the pre-scheduled service is part of the system bandwidth, the base station schedules the terminal to switch to the bandwidth occupied by the pre-scheduled service to receive the pre-scheduled service when the pre-scheduled service needs to be transmitted.

If the bandwidth occupied by the pre-scheduled service is within the narrow bandwidth, when the pre-scheduling service needs to be transmitted, the base station schedules the terminal to switch to the bandwidth occupied by the pre-scheduled service on a physical downlink control channel of the narrow bandwidth to receive the pre-scheduling service, and indicates a modulation and coding scheme of the pre-scheduling service and a time-frequency domain resource occupied by the pre-scheduling service in downlink control information of the physical downlink control channel of the narrow bandwidth.

A second aspect of an implementation of the present disclosure provides a method for transmitting a service. The method includes: a terminal receives a switch message of a narrow bandwidth receiving mode sent by a base station, and switches to a designated narrow bandwidth to receive information, wherein a width of the narrow bandwidth is smaller than a width of a system bandwidth; when a pre-scheduled service needs to be transmitted, the terminal switches to the system bandwidth or a bandwidth occupied by the pre-scheduled service to receive the pre-scheduled service according to scheduling of the base station.

In a possible implementation, the method further includes: the terminal receives downlink control information for the terminal in a physical downlink control channel on the narrow bandwidth; wherein the downlink control information is in a terminal-specific search space corresponding to the terminal, and uses a control channel element aggregation level corresponding to the terminal.

In a possible implementation, before the terminal receives the switch message of the narrow bandwidth receiving mode sent by the base station and switches to the designated narrow bandwidth to receive the information, the method further includes: the terminal receives information relevant to the pre-scheduled service sent by the base station, wherein the information relevant to the pre-scheduled service includes process identification information of the pre-scheduled service, periodic information of the pre-scheduled service and information of a resource allocated by the base station for the pre-scheduled service.

In a possible implementation, when the pre-scheduled service needs to be transmitted, switching, by the terminal, to the system bandwidth or the bandwidth occupied by the pre-scheduled service to receive the pre-scheduled service according to the scheduling of the base station, includes: the terminal receives information of a time interval during which the terminal is in the narrow bandwidth receiving mode and information of a time interval during which the terminal receives the pre-scheduled service, sent by the base station; when the pre-scheduled service needs to be transmitted, the terminal switches to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service.

In a possible implementation, when the pre-scheduled service needs to be transmitted, switching, by the terminal, to the system bandwidth or the bandwidth occupied by the pre-scheduled service to receive the pre-scheduled service according to the scheduling of the base station, includes: the terminal receives a time interval configured by the base station according to the periodic information of the pre-scheduled service, and the terminal switches to the system bandwidth or the bandwidth occupied by the pre-scheduled service according to the time interval to receive the pre-scheduled service.

In a possible implementation, when the pre-scheduled service needs to be transmitted, switching, by the terminal, to the system bandwidth or the bandwidth occupied by the pre-scheduled service to receive the pre-scheduled service according to the scheduling of the base station, includes: the terminal receives a process identification of the pre-scheduled service and first time information indicating when the terminal switches to the system bandwidth or the bandwidth occupied by the pre-scheduled service, sent by the base station in downlink control information of a physical downlink control channel of the narrow bandwidth, wherein the downlink control information is used for triggering the terminal to switch to the system bandwidth or the bandwidth occupied by the pre-scheduled service; the terminal receives second time information indicating when the terminal returns to the narrow bandwidth receiving mode, sent by the base station through the downlink control information, or detects a trigger signal for triggering the terminal to return to the narrow bandwidth receiving mode in a preset area of a physical downlink control channel of the system bandwidth; the terminal switches to the system bandwidth or the bandwidth occupied by the pre-scheduled service to receive the pre-scheduled service according to the first time information and the second time information or according to the first time information and the trigger signal.

In a possible implementation, if the bandwidth occupied by the pre-scheduled service is the system bandwidth, the terminal switches to the system bandwidth to receive the pre-scheduled service when the pre-scheduled service needs to be transmitted.

If the bandwidth occupied by the pre-scheduled service is part of the system bandwidth, the terminal switches to the bandwidth occupied by the pre-scheduled service to receive the pre-scheduled service when the pre-scheduled service needs to be transmitted.

If the bandwidth occupied by the pre-scheduled service is within the narrow bandwidth, when the pre-scheduling service needs to be transmitted, the terminal switches to the bandwidth occupied by the pre-scheduled service to receive the pre-scheduling service, and receives a modulation and coding scheme of the pre-scheduling service and a time-frequency domain resource occupied by the pre-scheduling service sent by the base station in downlink control information of a physical downlink control channel of the narrow bandwidth.

A third aspect of an implementation of the present disclosure provides a base station, including a sending unit and a scheduling unit.

The sending unit is used for sending a switch message of a narrow bandwidth receiving mode to a terminal to indicate the terminal to switch to a designated narrow bandwidth to receive information, wherein a width of the narrow bandwidth is smaller than a width of a system bandwidth.

The scheduling unit is used for scheduling the terminal to switch to the system bandwidth or a bandwidth occupied by a pre-scheduled service to receive the pre-scheduled service when the pre-scheduled service needs to be transmitted.

In a possible implementation, the sending unit is further used for sending downlink control information for the terminal in a physical downlink control channel on the narrow bandwidth.

Herein the downlink control information is in a terminal-specific search space corresponding to the terminal, and uses a control channel element aggregation level corresponding to the terminal.

In a possible implementation, the sending unit is further used for sending information relevant to the pre-scheduled service to the terminal before sending the switching message for the narrow bandwidth receiving mode to the terminal to indicate the terminal to switch to the designated narrow bandwidth to receive information, the information relevant to the pre-scheduled service includes process identification information of the pre-scheduled service, period information of the pre-scheduled service and information of a resource allocated by the base station for the pre-scheduled service.

In a possible implementation, the scheduling unit is specifically used for:

configuring information of time interval during which the terminal is in the narrow bandwidth receiving mode and information of time interval during which the terminal receives the pre-scheduled service, and sending the information of the time interval during which the terminal is in the narrow bandwidth receiving mode and the information of the time interval during which the terminal receives the pre-scheduled service to the terminal; and scheduling the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

In a possible implementation, the scheduling unit is specifically used for: configuring, according to the periodic information of the pre-scheduled service, the terminal that is in the narrow bandwidth receiving mode to switch to the system bandwidth or the bandwidth occupied by the pre-scheduled service according to a time interval to receive the pre-scheduled service.

In a possible implementation, the scheduling unit is specifically used for: sending a process identification of the pre-scheduled service and first time information of when the terminal switches to the system bandwidth or the bandwidth occupied by the pre-scheduled service, in downlink control information of a physical downlink control channel of the narrow bandwidth, wherein the downlink control information is used for triggering the terminal to switch to the system bandwidth or the bandwidth occupied by the pre-scheduled service; sending second time information of when the terminal returns to the narrow bandwidth receiving mode in the downlink control information, or transmitting a trigger signal for triggering the terminal to return to the narrow bandwidth receiving mode in a preset area of a physical downlink control channel of the system bandwidth; and scheduling the terminal to switch to the system bandwidth or the bandwidth occupied by the pre-scheduled service to receive the pre-scheduled service according to the first time information and the second time information or according to the first time information and the trigger signal.

In a possible implementation, if the bandwidth occupied by the pre-scheduled service is the system bandwidth, the scheduling unit is specifically used for scheduling the terminal to switch to the system bandwidth to receive the pre-scheduled service when the pre-scheduled service needs to be transmitted.

If the bandwidth occupied by the pre-scheduled service is part of the system bandwidth, when the pre-scheduled service needs to be transmitted, the scheduling unit is specifically used for scheduling the terminal to switch to the bandwidth occupied by the pre-scheduled service to receive the pre-scheduled service;

If the bandwidth occupied by the pre-scheduled service is within the narrow bandwidth, when the pre-scheduling service needs to be transmitted, the scheduling unit is specifically used for scheduling the terminal to switch to the bandwidth occupied by the pre-scheduled service in a physical downlink control channel of the narrow bandwidth to receive the pre-scheduling service, and indicating a modulation and coding scheme of the pre-scheduling service and a time-frequency domain resource occupied by the pre-scheduling service in downlink control information of a physical downlink control channel of the narrow bandwidth.

A fourth aspect of an implementation of the present disclosure provides a base station, including a processor, a storage, a transceiver and a bus. Herein the processor, the storage and the transceiver are connected through the bus, the transceiver is used for receiving and transmitting signals to communicate with a terminal, the storage is used for storing a set of program codes, and the processor is used for calling the set of the program codes stored in the storage to perform operations of: sending a switch message of a narrow bandwidth receiving mode to a terminal through the transceiver to indicate the terminal to switch to a designated narrow bandwidth to receive information, wherein a width of the narrow bandwidth is smaller than the width of a system bandwidth; and scheduling the terminal to switch to the system bandwidth or a bandwidth occupied by a pre-scheduled service to receive the pre-scheduled service when the pre-scheduled service needs to be transmitted.

In a possible implementation, the processor is further used for sending downlink control information for the terminal through the transceiver in a physical downlink control channel on the narrow bandwidth.

Herein the downlink control information is in a terminal-specific search space corresponding to the terminal, and uses a control channel element aggregation level corresponding to the terminal.

In a possible implementation, the processor is further used for sending information relevant to the pre-scheduled service to the terminal through the transceiver before sending the switch message of the narrow bandwidth receiving mode to the terminal through the transceiver to indicate the terminal to switch to a designated narrow bandwidth to receive information, wherein the information relevant to the pre-scheduled service includes process identification information of the pre-scheduled service, periodic information of the pre-scheduled service, and information of a resource allocated by the base station for the pre-scheduled service.

In a possible implementation, the processor is specifically used for: configuring information of a time interval during which the terminal is in the narrow bandwidth receiving mode and information of a time interval during which the terminal receives the pre-scheduled service, and sending the information of the time interval during which the terminal is in the narrow bandwidth receiving mode and the information of the time interval during which the terminal receives the pre-scheduled service to the terminal; scheduling the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

In a possible implementation, the processor is specifically used for: configuring, according to the periodic information of the pre-scheduled service, the terminal that is in the narrow bandwidth receiving mode to switch to the system bandwidth or the bandwidth occupied by the pre-scheduled service according to a time interval to receive the pre-scheduled service.

In a possible implementation, the processor is specifically used for: sending a process identification of the pre-scheduled service and first time information of when the terminal switches to the system bandwidth or the bandwidth occupied by the pre-scheduled service, in downlink control information of a physical downlink control channel of the narrow bandwidth, wherein the downlink control information is used for triggering the terminal to switch to the system bandwidth or the bandwidth occupied by the pre-scheduled service; sending second time information of when the terminal returns to the narrow bandwidth receiving mode in the downlink control information, or transmitting a trigger signal for triggering the terminal to return to the narrow bandwidth receiving mode in a preset area of a physical downlink control channel of the system bandwidth; and scheduling the terminal to switch to the system bandwidth or the bandwidth occupied by the pre-scheduled service to receive the pre-scheduled service according to the first time information and the second time information or according to the first time information and the trigger signal.

In a possible implementation, the processor is specifically used for: if the bandwidth occupied by the pre-scheduled service is the system bandwidth, scheduling the terminal to switch to the system bandwidth to receive the pre-scheduled service when the pre-scheduled service needs to be transmitted; if the bandwidth occupied by the pre-scheduled service is part of the system bandwidth, scheduling the terminal switching to the bandwidth occupied by the pre-scheduled service to receive the pre-scheduled service when the pre-scheduled service needs to be transmitted; or if the bandwidth occupied by the pre-scheduled service is within the narrow bandwidth, when the pre-scheduling service needs to be transmitted, scheduling the terminal to switch to the bandwidth occupied by the pre-scheduled service in a physical downlink control channel of the narrow bandwidth to receive the pre-scheduling service, and indicating a modulation and coding scheme of the pre-scheduling service and a time-frequency domain resource occupied by the pre-scheduling service in downlink control information of a physical downlink control channel of the narrow bandwidth.

A fifth aspect of an implementation of the present disclosure provides a terminal, including a receiving unit and a switching unit.

The receiving unit is used for receiving a switch message of a narrow bandwidth receiving mode sent by a base station.

The switching unit is used for switching to a designated narrow bandwidth to receive information according to the switch message, wherein a width of the narrow bandwidth is smaller than a width of a system bandwidth.

The switching unit is further used for switching to the system bandwidth or a bandwidth occupied by a pre-scheduled service to receive the pre-scheduled service according to scheduling of the base station when the pre-scheduled service needs to be transmitted.

In a possible implementation, the receiving unit is further used for receiving downlink control information for the terminal in a physical downlink control channel on the narrow bandwidth.

Herein the downlink control information is in a terminal-specific search space corresponding to the terminal, and uses a control channel element aggregation level corresponding to the terminal.

In a possible implementation, the receiving unit is further used for receiving information relevant to the pre-scheduled service sent by the base station before receiving the switching message for the narrow bandwidth receiving mode sent by the base station, the information relevant to the pre-scheduled service includes process identification information of the pre-scheduled service, period information of the pre-scheduled service and information of a resource allocated by the base station for the pre-scheduled service.

In a possible implementation, the receiving unit is specifically used for: receiving information of a time interval during which the terminal is in the narrow bandwidth receiving mode and information of a time interval during which the terminal receives the pre-scheduled service, sent by the base station.

The switching unit is specifically used for: switching to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

In a possible implementation, the receiving unit is specifically used for: receiving a time interval configured by the base station according to the periodic information of the pre-scheduled service.

The switching unit is specifically used for: switching to the system bandwidth or the bandwidth occupied by the pre-scheduled service according to the time interval to receive the pre-scheduled service.

In a possible implementation, the receiving unit is specifically used for: receiving a process identification of the pre-scheduled service and first time information indicating when the terminal switches to the system bandwidth or the bandwidth occupied by the pre-scheduled service, sent by the base station in downlink control information of a physical downlink control channel of the narrow bandwidth, wherein the downlink control information is used for triggering the terminal to switch to the system bandwidth or the bandwidth occupied by the pre-scheduled service; and receiving second time information indicating when the terminal returns to the narrow bandwidth receiving mode, sent by the base station through the downlink control information, or detecting a trigger signal for triggering the terminal to return to the narrow bandwidth receiving mode in a preset area of a physical downlink control channel of the system bandwidth.

The switching unit is specifically used for: switching to the system bandwidth or the bandwidth occupied by the pre-scheduled service to receive the pre-scheduled service according to the first time information and the second time information, or according to the first time information and the trigger signal.

In a possible implementation, if the bandwidth occupied by the pre-scheduled service is the system bandwidth, the switching unit is specifically used for switching to the system bandwidth to receive the pre-scheduled service when the pre-scheduled service needs to be transmitted.

If the bandwidth occupied by the pre-scheduled service is part of the system bandwidth, when the pre-scheduled service needs to be transmitted, the switching unit is specifically used for switching to the bandwidth occupied by the pre-scheduled service to receive the pre-scheduled service.

If the bandwidth occupied by the pre-scheduled service is within the narrow bandwidth, when the pre-scheduling service needs to be transmitted, the switching unit is specifically used for switching to the bandwidth occupied by the pre-scheduled service to receive the pre-scheduling service, and the receiving unit is further used for receiving a modulation and coding scheme of the pre-scheduling service and a time-frequency domain resource occupied by the pre-scheduling service sent by the base station in downlink control information of a physical downlink control channel of the narrow bandwidth.

A sixth aspect of an implementation of the present disclosure provides a terminal, including a processor, a storage, a transmitter, a receiver and a bus. The processor, the storage, the transmitter and the receiver are connected through the bus. The transmitter is used for transmitting signals, the receiver is used for receiving signals, the transmitter and the receiver are independently configured respectively or integrated, the storage is used for storing a set of program codes, and the processor is used for calling the set of the program codes stored in the storage to perform operations of: receiving a switch message of a narrow bandwidth receiving mode sent by a base station through the receiver, and switching to a designated narrow bandwidth to receive information, wherein a width of the narrow bandwidth is smaller than a width of a system bandwidth; and switching to the system bandwidth or a bandwidth occupied by a pre-scheduled service to receive the pre-scheduled service according to a scheduling of the base station when the pre-scheduled service needs to be transmitted.

In a possible implementation, the processor is further used for receiving downlink control information for the terminal in a physical downlink control channel on the narrow bandwidth through the receiver.

Herein the downlink control information is in a terminal-specific search space corresponding to the terminal, and uses a control channel element aggregation level corresponding to the terminal.

In a possible implementation, the processor is further used for receiving information relevant to the pre-scheduled service sent by the base station through the receiver before receiving the switching message for the narrow bandwidth receiving mode sent by the base station through the receiver, and switching to the designated narrow bandwidth to receive information. Herein, the information relevant to the pre-scheduled service includes process identification information of the pre-scheduled service, period information of the pre-scheduled service, and information of a resource allocated by the base station for the pre-scheduled service.

In a possible implementation, the processor is specifically used for receiving information of a time interval during which the terminal is in the narrow bandwidth receiving mode and information of a time interval during which the terminal receives the pre-scheduled service through the receiver, sent by the base station; switching to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

In a possible implementation, the processor is specifically used for: receiving through the receiver a time interval configured by the base station according to the periodic information of the pre-scheduled service, and switching to the system bandwidth or the bandwidth occupied by the pre-scheduled service according to the time interval to receive the pre-scheduled service.

In a possible implementation, the processor is specifically used for: receiving, through the receiver, a process identification of the pre-scheduled service and first time information indicating when the terminal switches to the system bandwidth or the bandwidth occupied by the pre-scheduled service, sent by the base station in downlink control information of a physical downlink control channel of the narrow bandwidth, wherein the downlink control information is used for triggering the terminal to switch to the system bandwidth or the bandwidth occupied by the pre-scheduled service; receiving, through the receiver, second time information indicating when the terminal returns to the narrow bandwidth receiving mode, sent by the base station through the downlink control information, or detecting a trigger signal for triggering the terminal to return to the narrow bandwidth receiving mode in a preset area of a physical downlink control channel of the system bandwidth; and switching to the system bandwidth or the bandwidth occupied by the pre-scheduled service to receive the pre-scheduled service according to the first time information and the second time information or according to the first time information and the trigger signal.

In a possible implementation, if the bandwidth occupied by the pre-scheduled service is the system bandwidth, the processor is specifically used for switching to the system bandwidth to receive the pre-scheduled service when the pre-scheduled service needs to be transmitted.

If the bandwidth occupied by the pre-scheduled service is part of the system bandwidth, when the pre-scheduled service needs to be transmitted, the processor is specifically used for switching to the bandwidth occupied by the pre-scheduled service to receive the pre-scheduled service.

If the bandwidth occupied by the pre-scheduled service is within the narrow bandwidth, when the pre-scheduling service needs to be transmitted, the processor is specifically used for switching to the bandwidth occupied by the pre-scheduled service to receive the pre-scheduling service, and receiving a modulation and coding scheme of the pre-scheduling service and a time-frequency domain resource occupied by the pre-scheduling service sent by the base station through the receiver in downlink control information of a physical downlink control channel of the narrow bandwidth.

A seventh aspect of an implementation of the present disclosure provides a computer storage medium including a set of program codes for executing the method according to any of the implementations of the first aspect of the implementations of the present disclosure.

An eighth aspect of an implementation of the present disclosure provides a computer storage medium including a set of program codes for executing the method according to any of the implementations of the second aspect of the implementations of the present disclosure.

BRIEF DESCRIPTION OF DRAWINGS

To explain technical solutions of implementations of the present disclosure or the existing technology more clearly, drawings referred to in the implementations will be briefly introduced below. Obviously, the drawings in the following description are only some implementations of the present disclosure. For those of ordinary skill in the art, other drawings may be obtained according to those drawings without paying an inventive effort.

DETAILED DESCRIPTION

The terms "include" and "have" and any variations thereof in the description and the claims and the above drawings of the present disclosure are intended to cover non-exclusive inclusion. For example, a process, method, system, product, or apparatus that includes a series of steps or units is not limited to the listed acts or units, but optionally further includes acts or units not listed, or optionally further includes other acts or units inherent to the process, method, product, or apparatus.

With continuous increasing of people's communication demands, communication technology is developing rapidly, and can provide users with larger bandwidth, faster uplink and downlink transmission speeds, etc. For example, in a 5G system, a system bandwidth of up to 200 MHz may be provided. However, with the expansion of the system bandwidth, if the terminal receives a PDCCH on a relatively large system bandwidth, the power consumption of the terminal is relatively high. If the terminal always works on a relatively narrow bandwidth, the system performance will be affected, which can cause some pre-scheduled services not to be transmitted normally. Therefore, implementations of the present disclosure provide a method for transmitting a service, so that the terminal can switch to a narrow bandwidth that is smaller than the system bandwidth to work, thereby saving the power consumption of the terminal, and further can switch to the system bandwidth or the bandwidth occupied by the pre-scheduled service to receive the pre-scheduled service when the pre-scheduled service needs to be transmitted. For convenience of explanation, the implementations of the present disclosure are described as a 5G system. Those skilled in the art should understand that implementations in the implementations of the present disclosure may also be applied to existing communication systems and future higher-level communication systems such as a 6G communication system and a 7G communication system. The implementations of the present disclosure are limited thereto.

The method for transmitting the service and devices according to the implementations of the present disclosure will be described in detail below with reference to the accompanying drawings.

Figure 1:
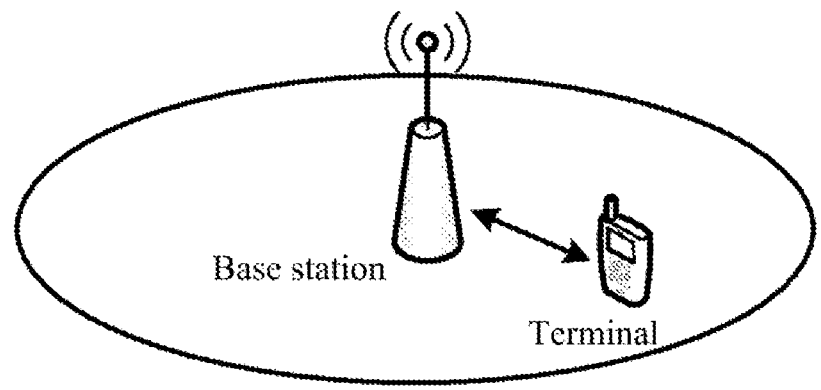
FIG. 1 is a schematic diagram of architecture of a communication system according to an implementation of the present disclosure.

Referring to FIG. 1, FIG. 1 is a schematic diagram of architecture of a communication system according an implementation of the present disclosure. A base station and at least one terminal may be included in the FIG. 1, and the terminal may also be referred to as User Equipment (UE).

The base station may be an Evolved Node B (eNB), a Node B (NB), a Base Station Controller (BSC), a Base Transceiver Station (BTS), a home base station (e.g., Home evolved NodeB, or Home Node B, HNB), a BaseBand Unit (BBU), etc. It may also be referred to as a base station transceiver, a wireless base station, a wireless transceiver, a transceiver function, a Base Station Sub system (BSS), or some other suitable terminology. The base station may bear scheduling downlink control information in a PDCCH, and may specifically include transmission format information, resource allocation information, uplink scheduling grant information, power control information, uplink retransmission information, etc. And it may transmit downlink data of the service to the UE, and receive retransmission feedback of the terminal and the like. For the pre-scheduled service, the base station may allocate a time-frequency domain resource for the terminal at initial scheduling, and the terminal may use the time-frequency domain resource in cycles. Thus, for the pre-scheduled service, the base station does not need to allocate the resource for the terminal for each time, thereby the overhead of PDCCH is saved, the terminal does not need to detect PDCCH for each time, and the power consumption of the terminal can be reduced.

The terminal may include a cellular phone, a smart phone, a Session Initiation Protocol (SIP) phone, a laptop computer, a Personal Digital Assistant (PDA), a satellite radio, a global positioning system, a multimedia device, a video device, a digital audio player (e.g., an MP3 player), a camera, a game console, or any other device with similar functions. The terminal may also be referred, by those skilled in the art, to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client, or some other suitable terminology. The terminal may receive control information configured by the base station and a time-frequency domain resource scheduled by the base station to transmit uplink service data and retransmission feedback information. The terminal may further switch between a narrow bandwidth and a system bandwidth according to the scheduling of the base station.

To reduce the power consumption of the terminal, in the implementations of the present disclosure, the terminal may be configured to work on the narrow bandwidth that is smaller than the system bandwidth. To ensure normal transmission of the pre-scheduled service, in the implementations of the present disclosure the terminal may be scheduled to switch to the system bandwidth or the bandwidth occupied by the pre-scheduled service to receive the pre-scheduled service when the pre-scheduled service needs to be transmitted.

A method for transmitting a service according to the present disclosure will be described in detail with reference to FIGS. 2 to 7.

Figure 2:
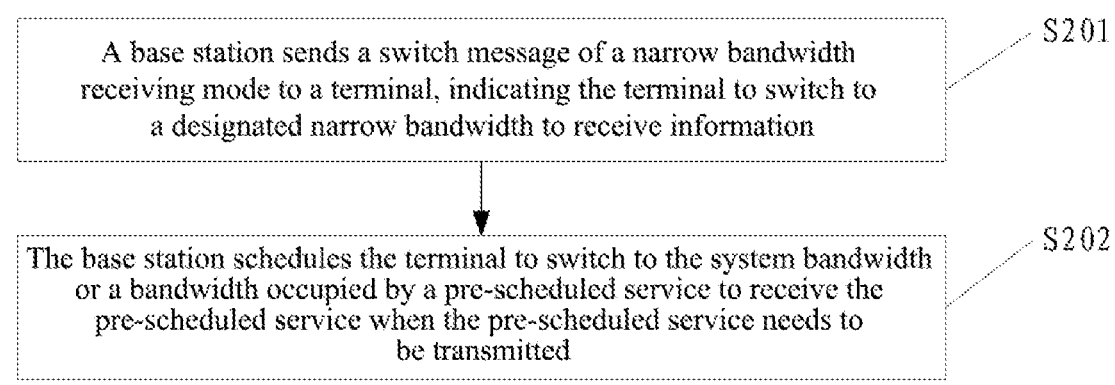
FIG. 2 is a flow chart of a first implementation of a method for transmitting a service according to the present disclosure.

Referring to FIG. 2, FIG. 2 is a flow chart of a first implementation of a method for transmitting a service according to the present disclosure. In the implementation, the service transmission method includes following acts S201-S202.

In S201, a base station sends a switch message of a narrow bandwidth receiving mode to a terminal to indicate the terminal to switch to a designated narrow bandwidth to receive information.

A width of the narrow bandwidth is smaller than a width of a system bandwidth. The switch message may include indication of the time when the terminal enters the narrow bandwidth receiving mode and a position of the narrow bandwidth on a frequency band when the terminal enters the narrow bandwidth receiving mode.

Optionally, the time of entering the narrow bandwidth receiving mode may include a starting time of entering the narrow bandwidth receiving mode. After receiving the switch message, the terminal enters the narrow bandwidth receiving mode at a designated starting time, switches to the system bandwidth until the terminal receives a message of stopping the narrow bandwidth receiving mode sent from the base station. Or the terminal may switch from a current narrow bandwidth to another narrow bandwidth or the system bandwidth when receiving a message of switching to another narrow bandwidth or the system bandwidth sent by the base station.

The time of entering the narrow bandwidth receiving mode may include an ending time of being in the narrow bandwidth receiving mode besides the starting time of entering the narrow bandwidth receiving mode. The terminal may enter the narrow bandwidth receiving mode at a designated starting time and switch back to the system bandwidth at a designated ending time to receive information.

Optionally, the base station may indicate the terminal to switch to a mode of only receiving narrow bandwidth through a high-layer signaling, such as a Radio Resource Control (RRC) signaling, or a physical-layer signaling, such as DCI. The base station may indicate the terminal a specific time at which the narrow bandwidth receiving mode starts and a specific position of the narrow bandwidth on a frequency band. In such way, the terminal may switch to the designated narrow bandwidth to receive information according to the switch message. In the narrow bandwidth receiving mode, the terminal may retune its radio frequency bandwidth to a width of frequency domain, indicated by the system to the terminal, only on which to the terminal performs reception, that is, the designated narrow bandwidth. For example, if a narrow bandwidth that is indicated by the base station to the terminal is 6 PRBs (taking a subcarrier spacing of 15 KHz as an example, it is 1.4 MHz), the terminal will retune its radio frequency unit to the position of the 6 PRBs of the narrow bandwidth on a frequency band, indicated by the system. At this case, the terminal can only receive signals on the 6 PRBs. Due to the reduction of the receiving radio frequency bandwidth, the terminal can obtain effect of saving power. The terminal does not need to detect signals on a wide system bandwidth, but only needs to receive signals and detect signals on a narrow bandwidth that is smaller than the system bandwidth, thereby reducing the workload of the terminal, reducing the power consumption of the terminal, and improving the efficiency of the terminal in receiving signals.

It should be noted that for a terminal supporting machine-to-machine (MTC), downlink signals may be demodulated on a bandwidth of 1.4 MHz, that is, 6 PRBs. For such type of the terminal, the power consumption of the terminal can be saved as the downlink bandwidth becomes small. However, since such type of the terminal can only work on the narrow bandwidth, such as 6 PRBs, the functions of the terminal will be greatly restricted. The width of the narrow bandwidth in the implementation of the present disclosure is smaller than the width of the system bandwidth, that is, the narrow bandwidth in the implementation of the present disclosure refers to a width that is less than the width of the system bandwidth in the frequency domain. The narrow bandwidth is a different concept from the bandwidth of 1.4 MHz in the existing 4G system. For example, typical system bandwidths in the existing 4G system are 10 MHz and 20 MHz. When the system bandwidth is 10 MHz, the narrow bandwidth in the implementation of the present disclosure may be a bandwidth that is less than 10 MHz, such as 2 MHz, 5 MHz, etc. When the system bandwidth is 20 MHz, the narrow bandwidth in the implementation of the present disclosure may be a bandwidth that is less than 20 MHz, such as 5 MHz, 10 MHz, 12 MHz, etc. When the system bandwidth is 1.4 MHz, the narrow bandwidth in the implementation of the present disclosure may be a bandwidth that is less than 1.4 MHz, such as 0.6 MHz. For the 5G system with a large bandwidth, the narrow bandwidth may also be a bandwidth that is less than the system bandwidth in the 5G system.

The power consumption of the terminal is mainly represented in two aspects. In a first aspect, the terminal detects signals on the whole system bandwidth. In a second aspect, the terminal performs PDCCH blind detection, and the PDCCH blind detection includes detection of different control channel element aggregation levels such as 2, 4, 8, and detection of different DCI lengths, and the like. DCI detected by the terminal includes DCI only for a single terminal, which needs to be detected in a UE-specific search space, and DCI for multiple terminals, which needs to be detected in a common search space. Due to the large amount of detected contents, the power consumption of the terminal is relatively high. At this case, the downlink control information for the terminal may be sent in the physical downlink control channel on the narrow bandwidth.

Herein, the downlink control information is in a terminal-specific search space corresponding to the terminal, and uses a control channel element aggregation level corresponding to the terminal.

Under the narrow bandwidth receiving mode, the PDCCH used by the base station to schedule the terminal is on the narrow bandwidth indicated by the base station. To reduce the complexity of the terminal receiving such PDCCH, the PDCCH on the narrow bandwidth may carry DCI for an individual terminal, but does not carry DCI for all terminals on the narrow bandwidth. In other words, the PDCCH on the narrow bandwidth only contains the UE-specific search space, but does not contain the common search space. In addition, for the DCI for an individual terminal, its control channel element aggregation level may be fixed, for example, when the base station configures a narrow bandwidth receiving mode to the terminal, what the control channel element aggregation level of the terminal is may be designated to the terminal.

Since the PDCCH only contains the UE-specific search space and the fixed control channel element aggregation level, the amount of information that the terminal needs to detect when receiving the PDCCH on the narrow bandwidth, can be reduced, thus the power consumption of the terminal can be further reduced.

In S202, the base station schedules the terminal to switch to the system bandwidth or a bandwidth occupied by a pre-scheduled service to receive the pre-scheduled service when the pre-scheduled service needs to be transmitted.

Since the information relevant to the pre-scheduled service has been pre-configured to the terminal in the system bandwidth, when the terminal switches from the narrow bandwidth to the system bandwidth or the bandwidth occupied by the pre-scheduled service, the terminal may not need to detect the PDCCH on the system bandwidth or the bandwidth occupied by the pre-scheduled service, so that the power consumption of the terminal in the system bandwidth can also be effectively controlled.

Figure 3:
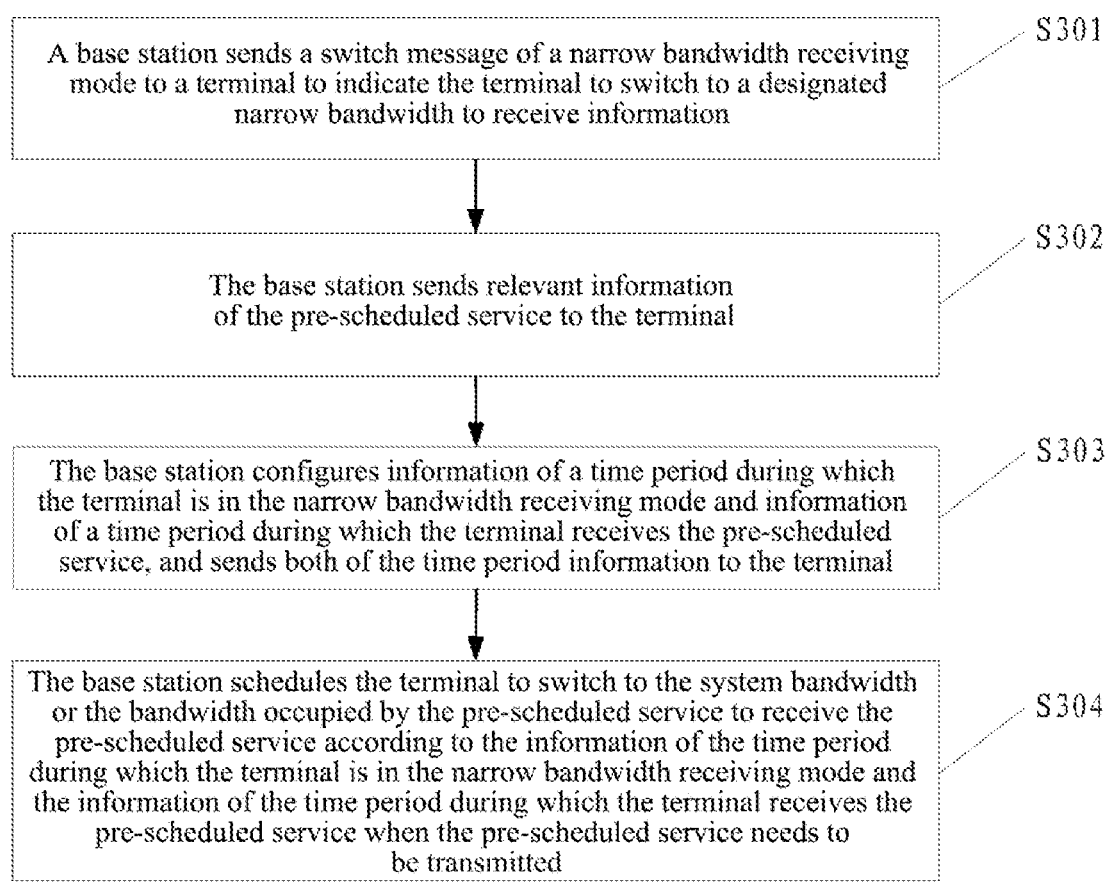
FIG. 3 is a flow chart of a second implementation of a method for transmitting a service according to the present disclosure.

Referring to FIG. 3, FIG. 3 is a flow chart of a second implementation of a service transmission method according to the present disclosure. In the implementation, the method includes following acts S301-S304.

In S301, a base station sends a switch message of a narrow bandwidth receiving mode to a terminal to indicate a terminal to switch to a designated narrow bandwidth to receive information.

Herein a width of the narrow bandwidth is smaller than a width of a system bandwidth.

In S302, the base station sends information relevant to the pre-scheduled service to the terminal.

The information relevant to the pre-scheduled service may include, but is not limited to, process identification information of the pre-scheduled service, periodic information of the pre-scheduled service and information of a resource allocated by the base station for the pre-scheduled service.

The process identification information may be used to distinguish different pre-scheduled services, and the base station may pre-configure and send the information relevant to the pre-scheduled service to the terminal before the terminal enters the narrow bandwidth receiving mode. The base station may configure multiple pre-scheduled service processes to the terminal, and the different processes may have corresponding process identifications for distinguishing. Cycles of the pre-scheduled services or resources used by the pre-scheduled services corresponding to different processes are usually not exactly the same.

If there is only one pre-scheduled service, the process identification information may not be sent.

In S303, the base station configures information of a time interval during which the terminal is in the narrow bandwidth receiving mode and information of a time interval during which the terminal receives the pre-scheduled service, and sends the information of the time interval during which the terminal is in the narrow bandwidth receiving mode and the information of the time interval during which the terminal receives the pre-scheduled service to the terminal.

In S304, the base station schedules the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

The base station may configure the time interval when the terminal is in the narrow bandwidth receiving mode, the time interval when the terminal may retune to the system bandwidth or the bandwidth occupied by the pre-scheduled service to receive the pre-scheduled service. When multiple pre-scheduled services are included, the base station may further configure which pre-scheduled service processes the terminal receives on the system bandwidth.

Figure 4:
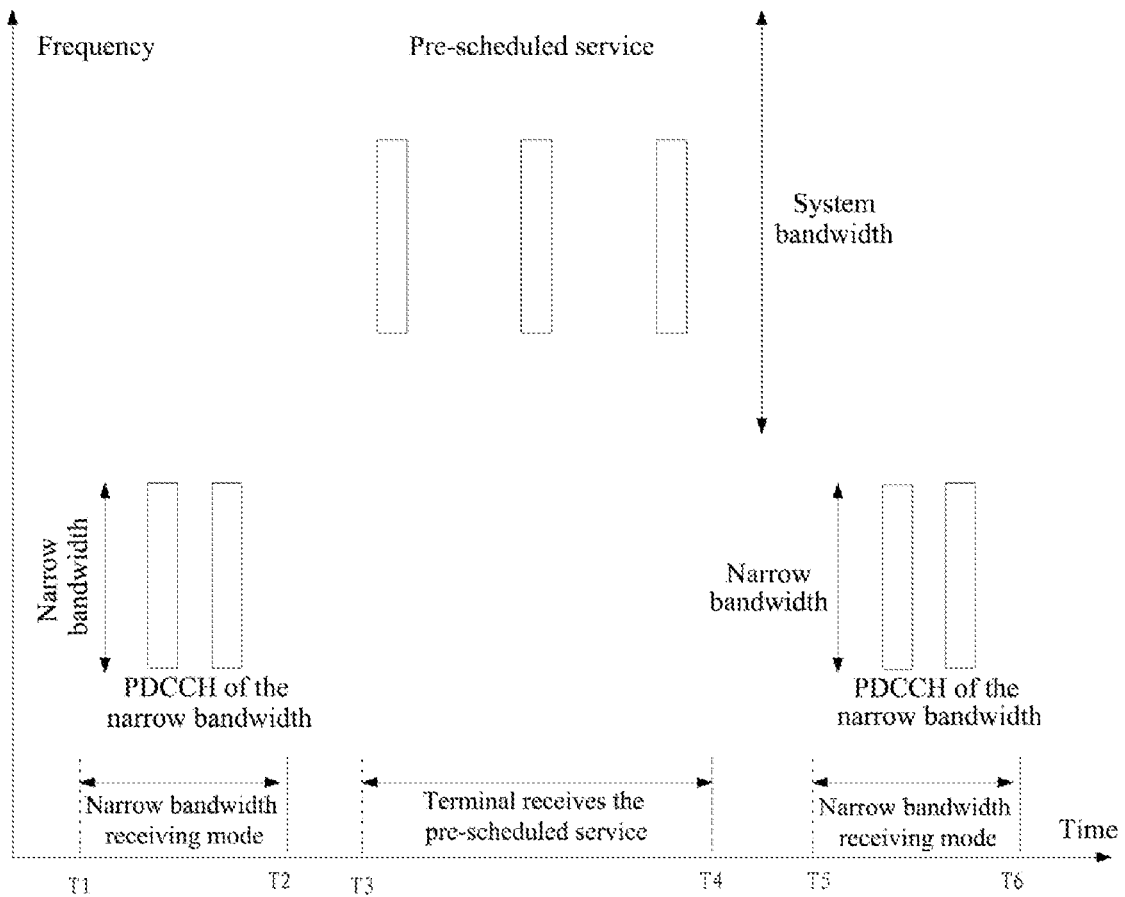
FIG. 4 is a schematic diagram of receiving a pre-scheduled service by using the method for transmitting the service shown in FIG. 3.

Referring to FIG. 4, FIG. 4 is a schematic diagram of receiving a pre-scheduled service by using the method for transmitting the service shown in FIG. 3. Herein, the base station may pre-configure that the terminal is in the narrow bandwidth receiving mode in a time interval of T1-T2, and receives the pre-scheduled service transmitted by the base station in a time interval of T3-T4, then returns to the narrow bandwidth receiving mode in a time interval of T5-T6. Herein, the time interval of T2-T3 is a time interval reserved for the terminal to retune from the narrow bandwidth to the system bandwidth or the bandwidth occupied by the pre-scheduled service. The time interval of T4-T5 is a time interval reserved for the terminal to retune back to the narrow bandwidth from the system bandwidth or the bandwidth occupied by the pre-scheduled service.

Moreover, the base station may further configure, according to periodic information of the pre-scheduled service, the terminal that is in the narrow bandwidth receiving mode to switch to the system bandwidth or the bandwidth occupied by the pre-scheduled service according to a time interval to receive the pre-scheduled service. At this case, in FIGS. 4, T1 to T4 is one cycle, and starting from T5, the terminal repeats operations of T1 to T4.

In the implementation, by designating a specific time interval of entering the narrow bandwidth receiving mode and a specific time interval of receiving the pre-scheduled service, the base station may transmit the pre-scheduled service on the premise of less configuration times, which is beneficial to reduce the overhead of the base station.

In addition to the above uniformly configuration transmission way, a trigger way may further be used for the transmission of the pre-scheduled service.

Figure 5:
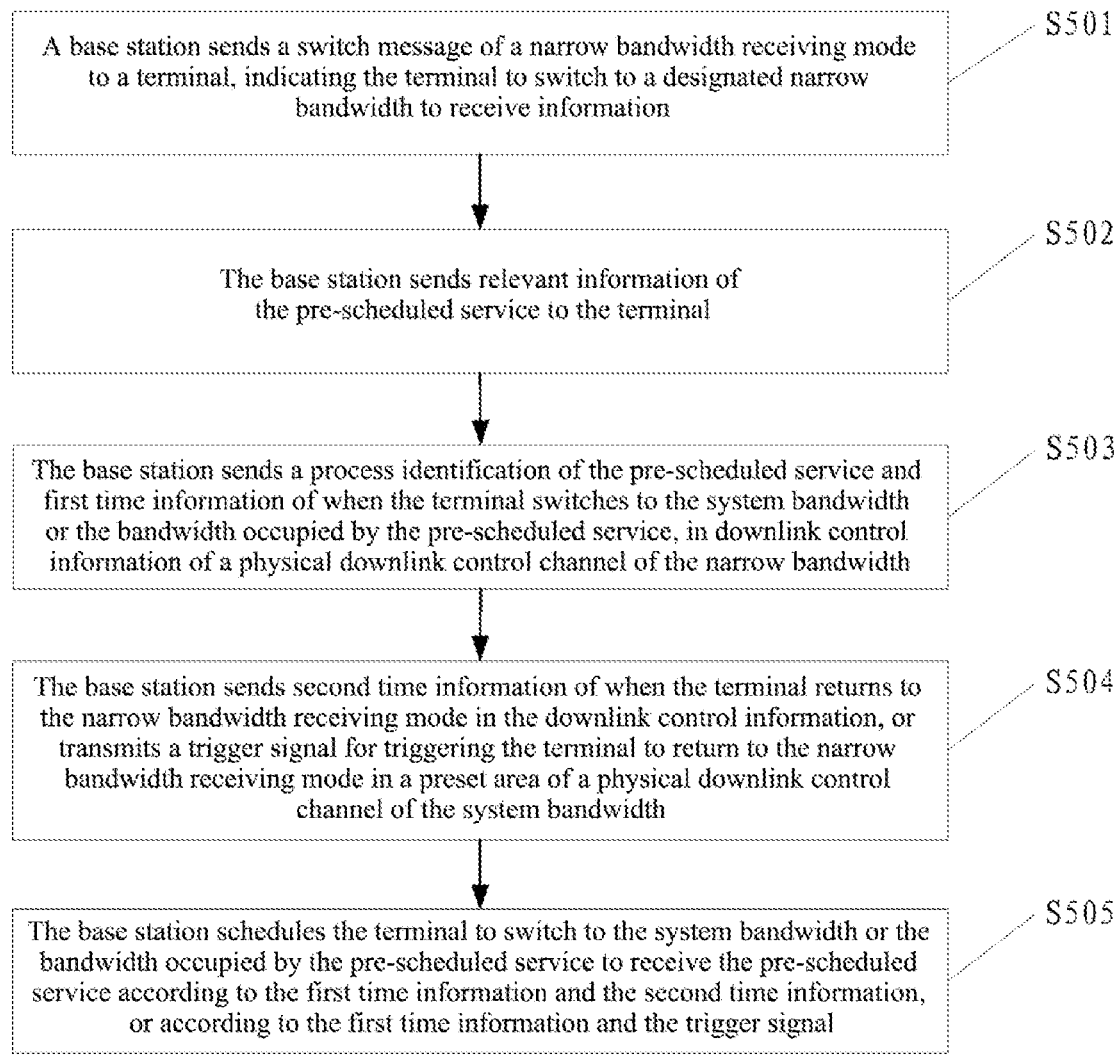
FIG. 5 is a flow chart of a third implementation of a method for transmitting a service according to the present disclosure.

Referring to FIG. 5, FIG. 5 is a flow chart of a third implementation of a method for transmitting a service according to the present disclosure. In this implementation, acts S501-S502 are the same as acts S301-S302 in FIG. 3 and will not be described repeatedly here. The method further includes the following acts S503-S505.

In S503, the base station sends a process identification of the pre-scheduled service and first time information of when the terminal switches to the system bandwidth or the bandwidth occupied by the pre-scheduled service, in downlink control information of a physical downlink control channel of the narrow bandwidth.

The downlink control information is used for triggering the terminal to switch to the system bandwidth or the bandwidth occupied by the pre-scheduled service.

In S504, the base station sends second time information of when the terminal returns to the narrow bandwidth receiving mode in the downlink control information, or transmits a trigger signal for triggering the terminal to return to the narrow bandwidth receiving mode in a preset area of a physical downlink control channel of the system bandwidth.

In S505, the base station schedules the terminal to switch to the system bandwidth or the bandwidth occupied by the pre-scheduled service to receive the pre-scheduled service according to the first time information and the second time information or according to the first time information and the trigger signal.

When the terminal is in the narrow bandwidth receiving mode, the base station may trigger the terminal to retune to the system bandwidth or the bandwidth occupied by the pre-scheduled service to receive the pre-scheduled service through the PDCCH of the narrow bandwidth. The base station may use DCI transmitted on the PDCCH of the narrow bandwidth as a trigger signal. The DCI may indicate one or more process identifications of the pre-scheduled services which are to be received by the terminal, and the time when the terminal retunes to the system bandwidth or the bandwidth occupied by the pre-scheduled service.

To notify the terminal when to return to the narrow band receiving mode from the system bandwidth, the base station may further indicate the time when the terminal returns to the narrow band receiving mode in the DCI. Optionally, the base station may trigger the terminal to return to the narrow band receiving mode through a trigger signal transmitted on a predetermined resource in the system bandwidth. For example, a signal of several bits transmitted in a predetermined time-frequency position, such as one or some certain Resource Element Groups (REGs), of a PDCCH in the system bandwidth, may be used as a trigger signal. It should be noted that based on consideration of saving power consumption of the terminal, the terminal may not need to detect the PDCCH on the system bandwidth, but only needs to detect the time-frequency position where the trigger signal is located.

In addition to the above-mentioned way in which the DCI is used to trigger the bandwidth switching, and indicate the time of starting to receive the pre-scheduled service and the time of returning to the narrow bandwidth receiving mode, i.e. DCI is used for triggering, and provides a starting time point and an ending time point for receiving the pre-scheduled service, following triggering way may further be adopted.

DCI triggers the switching and indicates a switch delay switching from the narrow bandwidth receiving mode to the system bandwidth or the bandwidth occupied by the pre-scheduled service. The starting time point of receiving the pre-scheduled service may be obtained by the trigger signal and the switch delay, and then the DCI indicates the time of returning to the narrow bandwidth receiving mode, thereby the starting time point and the ending time point of receiving the pre-scheduled service are determined.

Optionally, information of the ending time point of receiving the pre-scheduled service in the above two ways may also be triggered by a trigger signal stored in a predetermined resource, and the predetermined resource may also be several bits in one or some certain REGs of the PDDCH of the system bandwidth. And the trigger signal may be used for triggering the terminal to return to the narrow bandwidth receiving mode immediately, once the trigger signal is detected, or to return to the narrow bandwidth receiving mode after predetermined time, thereby determining the ending time point of receiving the pre-scheduled service.

In the implementation, the pre-scheduled service is transmitted through a triggering way, which can improve a flexibility of scheduling of the base station.

It should be noted that in the above implementations shown in FIGS. 2-5, whether to specifically schedule to the system bandwidth or the bandwidth occupied by the pre-scheduled service to receive the pre-scheduled service may be performed according to the bandwidth occupied by the pre-scheduled service.

Since a frequency-domain resource occupied by the pre-scheduled service may not occupy the whole system bandwidth, when the terminal retunes to receive the pre-scheduled service, its receiving bandwidth only needs to be capable of receiving the pre-scheduled service configured by the base station, and the terminal may not need to receive downlink data of the whole system bandwidth. Therefore, the terminal may decide the bandwidth of the pre-scheduled service retuned and received by the terminal according to the bandwidth of the pre-scheduled service configured by the base station, or the base station may configure the bandwidth required by the pre-scheduled service retuned and received by the terminal.

For example, if the bandwidth occupied by the pre-scheduled service is the system bandwidth, the base station may schedule the terminal to switch to the system bandwidth to receive the pre-scheduled service when the pre-scheduled service needs to be transmitted.

If the bandwidth occupied by the pre-scheduled service is part of the system bandwidth, the base station may schedule the terminal to switch to the bandwidth occupied by the pre-scheduled service to receive the pre-scheduled service when the pre-scheduled service needs to be transmitted.

If the bandwidth occupied by the pre-scheduled service is within the narrow bandwidth, when the pre-scheduling service needs to be transmitted, the base station may schedule the terminal to switch to the bandwidth occupied by the pre-scheduled service in a physical downlink control channel of the narrow bandwidth to receive the pre-scheduling service, and indicates a modulation and coding scheme of the pre-scheduling service and a time-frequency domain resource occupied by the pre-scheduling service in downlink control information of a physical downlink control channel of the narrow bandwidth. The situation may also be considered that the base station schedules and transmits the pre-scheduled service on the narrow bandwidth.

Figure 6:
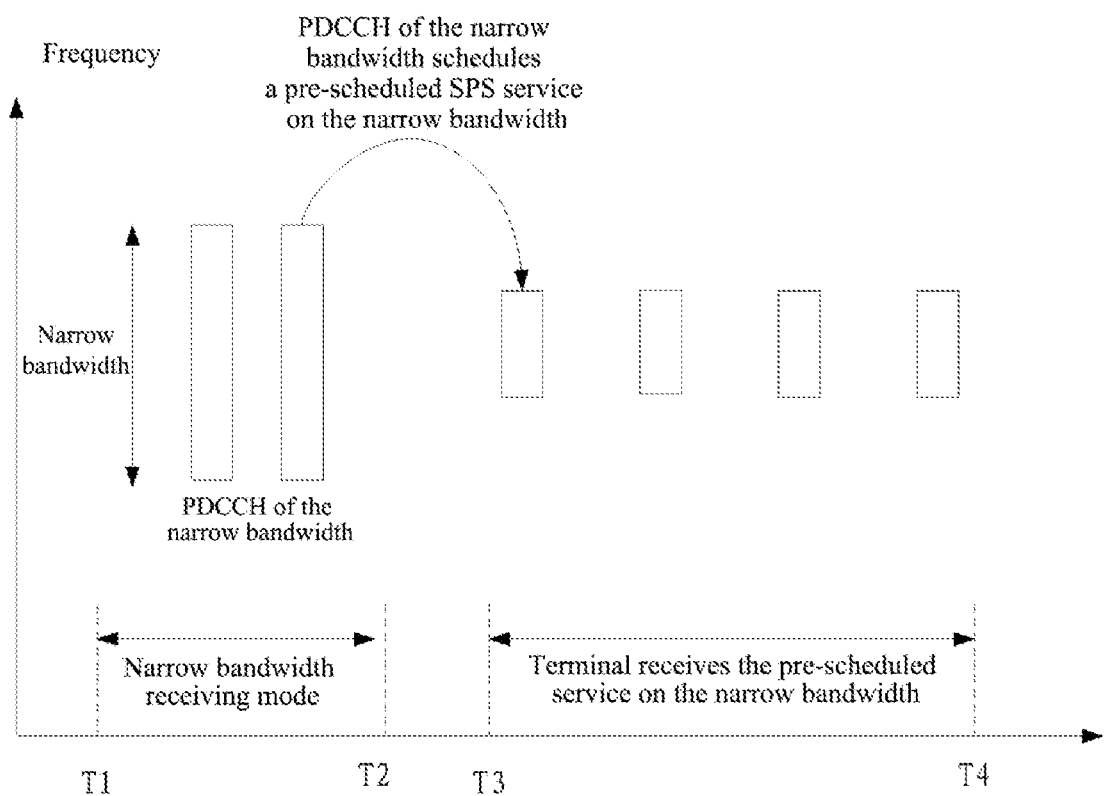
FIG. 6 is a schematic diagram of transmitting a pre-scheduled service on a narrow bandwidth according to an implementation of the present disclosure.

Referring to FIG. 6, FIG. 6 is a schematic diagram of transmitting a pre-scheduled service on a narrow bandwidth according to an implementation of the present disclosure.

Herein, the terminal is in a narrow bandwidth receiving mode within T1-T2 and may adhere to the PDCCH of the narrow bandwidth, and the base station may schedule the terminal to receive the pre-scheduled service on the narrow bandwidth through the PDCCH of the narrow bandwidth. As shown in FIG. 6, the pre-scheduled service on the narrow bandwidth is received within T3-T4, and T2-T3 is a time interval required for switching from the narrow bandwidth receiving mode to the transmission of the pre-scheduled service.

Since the frequency domain resource used by the pre-scheduled service is within the narrow bandwidth in this case, the terminal receives the pre-scheduled service within a narrow bandwidth without retuning to other frequency bands. For such type of the pre-scheduled service, the base station may directly schedule the pre-scheduled service on the narrow bandwidth through the PDCCH of the narrow bandwidth. Referring to FIG. 3, FIG. 3 is a schematic diagram of scheduling the pre-scheduled service on the narrow bandwidth. When the base station directly schedules the pre-scheduled service on the narrow bandwidth through the PDCCH of the narrow bandwidth, the base station needs to indicate a Modulation and Coding Scheme (MCS) of the pre-scheduled service, a time-frequency resource occupied by the pre-scheduled service in the DCI transmitted on the PDCCH of the narrow bandwidth. Since the bandwidth is relatively narrow, the overhead of the control information is also relatively small. It should be pointed out that when the terminal receives the pre-scheduled service on the narrow bandwidth, the terminal may normally detect the PDCCH of the narrow bandwidth. That is different from the case in which the terminal receives the pre-scheduled service on the system bandwidth. When the terminal receives the pre-scheduled service on the system bandwidth, since the information relevant to the pre-scheduled service has been obtained, the PDCCH of the system bandwidth may not be detected. If the pre-scheduled service is transmitted in cycles on the narrow bandwidth, after information relevant to the pre-scheduled service transmitted on the narrow bandwidth is obtained during the first scheduling and detection of the PDCCH of the narrow bandwidth, the PDCCH of the narrow bandwidth may not be detected when subsequent transmissions are performed in cycles.

Figure 7:
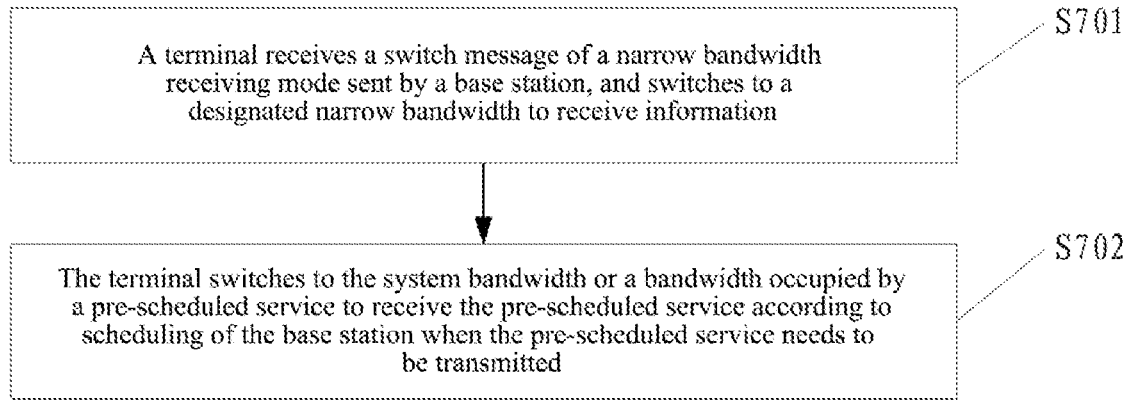
FIG. 7 is a flow chart of a fourth implementation of a method for transmitting a service according to the present disclosure.

It should be noted that the implementations of the service transmission method shown in FIGS. 2-6 above may be implemented independently or in combination with each other, and the implementations of the present disclosure are not limited thereto. Referring to FIG. 7, FIG. 7 is a flow chart of a fourth implementation of a method for transmitting a service according to the present disclosure. In the implementation, the service transmission method includes following acts S701-S702.

In S701, a terminal receives a switch message of a narrow bandwidth receiving mode sent by a base station, and switches to a designated narrow bandwidth to receive information.

Herein a width of the narrow bandwidth is smaller than a width of a system bandwidth. The switch message includes indication of the time when the terminal enters the narrow bandwidth receiving mode and a position of the narrow bandwidth on a frequency band when the terminal enters the narrow bandwidth receiving mode.

Optionally, the terminal may further receive downlink control information for the terminal in a physical downlink control channel on the narrow bandwidth.

Herein the downlink control information is in a terminal-specific search space corresponding to the terminal, and uses a control channel element aggregation level corresponding to the terminal.

In S702, the terminal switches to the system bandwidth or a bandwidth occupied by a pre-scheduled service to receive the pre-scheduled service according to scheduling of the base station when the pre-scheduled service needs to be transmitted.

FIG. 7 is for description of the implementation at the terminal side, and the specific process of the FIG. 7 may refer to the description of the implementation at the base station side shown in FIG. 2, and is not repeated here.

Figure 8:
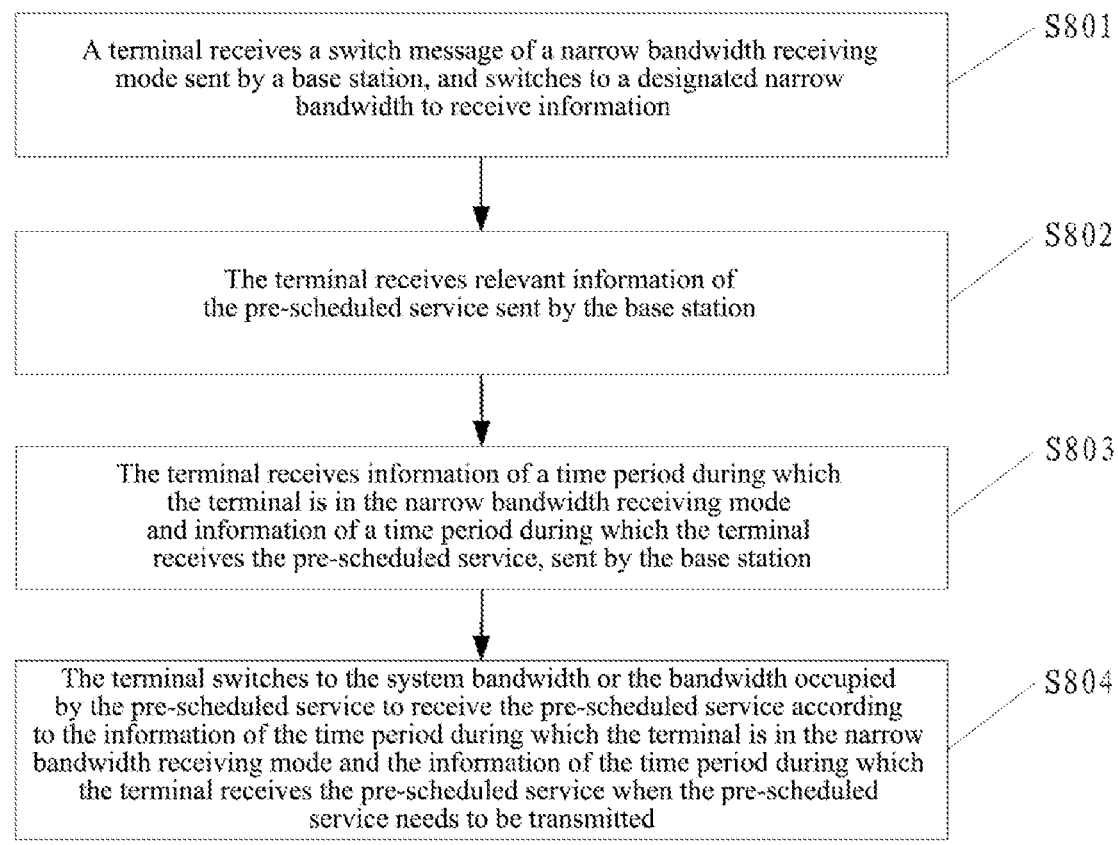
FIG. 8 is a flow chart of a method for transmitting a service according to the present disclosure.

Referring to FIG. 8, FIG. 8 is a flow chart of a fifth implementation of a method for transmitting a service according to the present disclosure. In the implementation, the service transmission method includes following acts S801-S804.

In S801, a terminal receives a switch message of a narrow bandwidth receiving mode sent by a base station, and switches to a designated narrow bandwidth to receive information.

In S802, the terminal receives information relevant to the pre-scheduled service sent by the base station.

The information relevant to the pre-scheduled service includes process identification information of the pre-scheduled service, periodic information of the pre-scheduled service and information of a resource allocated by the base station for the pre-scheduled service.

In S803, the terminal receives information of a time interval during the terminal is in the narrow bandwidth receiving mode and information of a time interval during which the terminal receives the pre-scheduled service, sent by the base station.

In S804, the terminal switches to the system bandwidth or the bandwidth occupied by the pre-scheduled service to receive the pre-scheduled service according to the information of the time interval during the terminal is in the narrow bandwidth receiving mode and the information of the time interval during which the terminal receives the pre-scheduled service when the pre-scheduled service needs to be transmitted.

Optionally, the terminal may further receive a time interval configured by the base station according to periodic information of the pre-scheduled service, and switches to the system bandwidth or the bandwidth occupied by the pre-scheduled service according to the time interval to receive the pre-scheduled service.

FIG. 8 is for description of the implementation at the terminal side, and the specific process of the FIG. 8 may refer to the description of the implementation at the base station side shown in FIG. 3, and is not repeated here.

Figure 9:
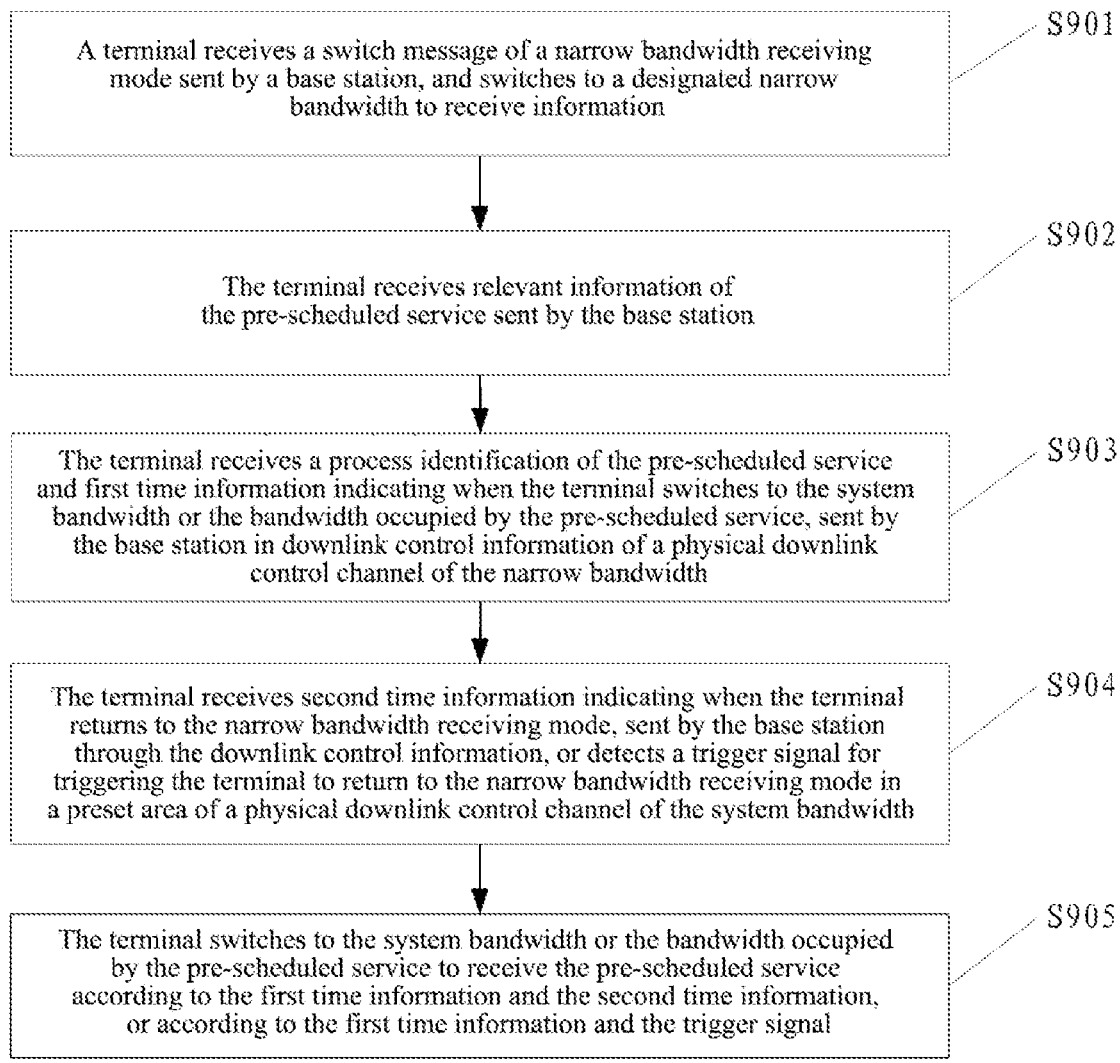
FIG. 9 is a flow chart of a method for transmitting a service according to a sixth implementation of the present disclosure.

Referring to FIG. 9, FIG. 9 is a flow chart of a sixth implementation of a service transmission method according to the present disclosure. In this implementation, acts S901-S902 is as same as acts S801-S802 compared to the implementation shown in FIG. 8, and will not be described repeatedly here. The method for transmitting the service further includes following acts S903-S905.

In S903, the terminal receives a process identification of the pre-scheduled service and first time information indicating when the terminal switches to the system bandwidth or the bandwidth occupied by the pre-scheduled service, sent by the base station in downlink control information of a physical downlink control channel of the narrow bandwidth.

The downlink control information is used for triggering the terminal to switch to the system bandwidth or the bandwidth occupied by the pre-scheduled service.

In S904, the terminal receives second time information indicating when the terminal returns to the narrow bandwidth receiving mode, sent by the base station through the downlink control information, or detects a trigger signal for triggering the terminal to return to the narrow bandwidth receiving mode in a preset area of a physical downlink control channel of the system bandwidth.

In S905, the terminal switches to the system bandwidth or the bandwidth occupied by the pre-scheduled service to receive the pre-scheduled service according to the first time information and the second time information, or according to the first time information and the trigger signal.

FIG. 9 is for description of the implementation at the terminal side, and the specific process may refer to the description of the implementation at the base station side shown in FIGS. 5-6, and is not repeated here.

Figure 10:
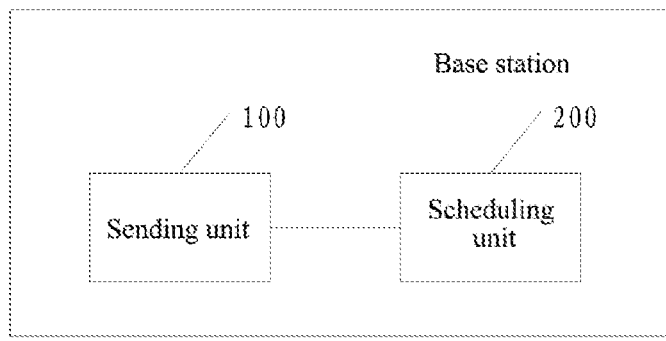
FIG. 10 is a schematic diagram of composition of a first implementation of a base station according to the present disclosure.

Referring to FIG. 10, FIG. 10 is a schematic diagram of a first implementation of composition of a base station according to the present disclosure. In this implementation, the base station includes a sending unit 100 and a scheduling unit 200.

The sending unit 100 is used for sending a switch message of a narrow bandwidth receiving mode to a terminal to indicate the terminal to switch to a designated narrow bandwidth to receive information, wherein a width of the narrow bandwidth is smaller than a width of a system bandwidth.

The scheduling unit 200 is used for scheduling the terminal to switch to the system bandwidth or a bandwidth occupied by a pre-scheduled service to receive the pre-scheduled service when the pre-scheduled service needs to be transmitted.

Optionally, the sending unit 100 is further used for sending downlink control information for the terminal in a physical downlink control channel on the narrow bandwidth.

The downlink control information is in a terminal-specific search space corresponding to the terminal, and uses a control channel element aggregation level corresponding to the terminal.

Optionally, the sending unit 100 is further used for sending information relevant to the pre-scheduled service to the terminal before sending the switch message of the narrow bandwidth receiving mode to the terminal to indicate the terminal to switch to the designated narrow bandwidth to receive information. The information relevant to the pre-scheduled service includes process identification information of the pre-scheduled service, periodic information of the pre-scheduled service, and information of a resource allocated by the base station for the pre-scheduled service.

Optionally, the scheduling unit 200 is specifically used for:

configuring information of a time interval during which the terminal is in the narrow bandwidth receiving mode and information of a time interval during which the terminal receives the pre-scheduled service, and sending the information of the time interval during which the terminal is in the narrow bandwidth receiving mode and the information of the time interval during which the terminal receives the pre-scheduled service to the terminal;

scheduling the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

Optionally, the scheduling unit 200 is specifically used for: configuring, according to the periodic information of the pre-scheduled service, the terminal that is in the narrow bandwidth receiving mode to switch to the system bandwidth or the bandwidth occupied by the pre-scheduled service according to a time interval to receive the pre-scheduled service.

Optionally, the scheduling unit 200 is specifically used for: sending a process identification of the pre-scheduled service and first time information of when the terminal switches to the system bandwidth or the bandwidth occupied by the pre-scheduled service, in downlink control information of a physical downlink control channel of the narrow bandwidth. The downlink control information is used for triggering the terminal to switch to the system bandwidth or the bandwidth occupied by the pre-scheduled service; sending second time information of when the terminal returns to the narrow bandwidth receiving mode, in the downlink control information, or transmitting a trigger signal for triggering the terminal to return to the narrow bandwidth receiving mode in a preset area of a physical downlink control channel of the system bandwidth; and scheduling the terminal to switch to the system bandwidth or the bandwidth occupied by the pre-scheduled service to receive the pre-scheduled service according to the first time information and the second time information or according to the first time information and the trigger signal.

Optionally, if the bandwidth occupied by the pre-scheduled service is the system bandwidth, when the pre-scheduled service needs to be transmitted, the scheduling unit 200 is specifically used for scheduling the terminal to switch to the system bandwidth to receive the pre-scheduled service.

If the bandwidth occupied by the pre-scheduled service is part of the system bandwidth, when the pre-scheduled service needs to be transmitted, the scheduling unit 200 is specifically used for scheduling the terminal to switch to the bandwidth occupied by the pre-scheduled service to receive the pre-scheduled service.

If the bandwidth occupied by the pre-scheduled service is within the narrow bandwidth, when the pre-scheduling service needs to be transmitted, the scheduling unit 200 is specifically used for scheduling the terminal to switch to the bandwidth occupied by the pre-scheduled service in a physical downlink control channel of the narrow bandwidth to receive the pre-scheduling service, and indicating a modulation and coding scheme of the pre-scheduling service and a time-frequency domain resource occupied by the pre-scheduling service in downlink control information of a physical downlink control channel of the narrow bandwidth.

Figure 11:
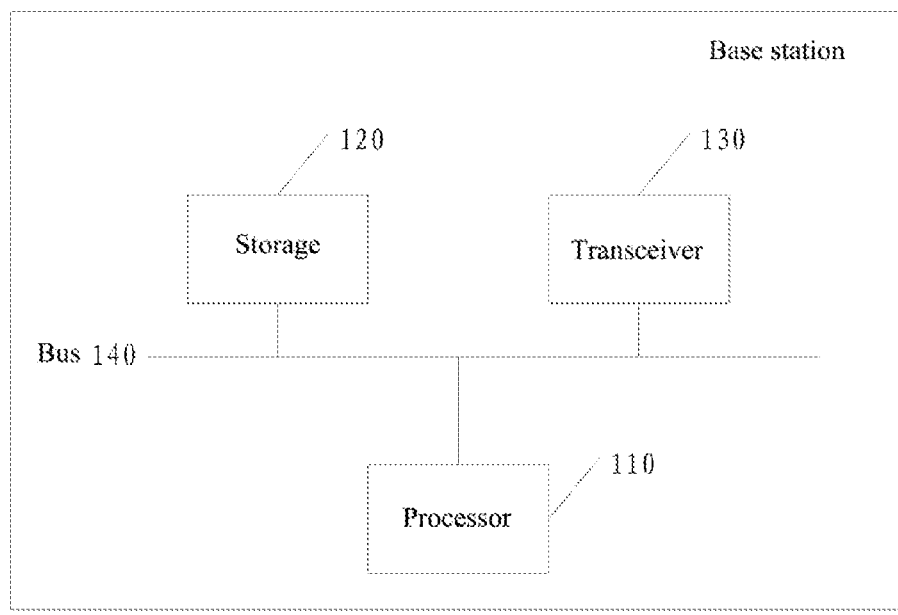
FIG. 11 is a schematic diagram of a second implementation of composition of a base station according to the present disclosure.

Referring to FIG. 11, FIG. 11 is a scheme diagram of a second implementation of composition of a base station according to the present disclosure. In this implementation, the base station includes a processor 110, a storage 120, a transceiver 130 and a bus 140. The processor 110, the storage 120 and the transceiver 130 are connected through the bus 140. The transceiver 130 is used for transmitting and receiving signals to communicate with terminals. The storage 120 is used for storing a set of program codes. The processor 110 is used for calling the set of the program codes stored in the storage 120 to perform following operations: sending a switch message of a narrow bandwidth receiving mode to a terminal through the transceiver 130 to indicate the terminal to switch to a designated narrow bandwidth to receive information, wherein a width of the narrow bandwidth is smaller than the width of a system bandwidth; and scheduling the terminal to switch to the system bandwidth or a bandwidth occupied by a pre-scheduled service to receive the pre-scheduled service when the pre-scheduled service needs to be transmitted.

Optionally, the processor 110 is further used for sending downlink control information for the terminal through the transceiver 130 in a physical downlink control channel on the narrow bandwidth.

The downlink control information is in a terminal-specific search space corresponding to the terminal, and uses a control channel element aggregation level corresponding to the terminal.

Optionally, the processor 110 is further used for sending information relevant to the pre-scheduled service to the terminal through the transceiver 130 before sending the switch message of the narrow bandwidth receiving mode to the terminal through the transceiver 130 to indicate the terminal to switch to the designated narrow bandwidth to receive the information. The information relevant to the pre-scheduled service includes process identification information of the pre-scheduled service, periodic information of the pre-scheduled service, and information of a resource allocated by the base station for the pre-scheduled service.

Optionally, the processor 110 is specifically used for:

configuring information of a time interval during which the terminal is in the narrow bandwidth receiving mode and information of a time interval during which the terminal receives the pre-scheduled service, and sending the information of the time interval during which the terminal is in the narrow bandwidth receiving mode and the information of the time interval during which the terminal receives the pre-scheduled service to the terminal;

scheduling the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

Optionally, the processor 110 is specifically used for: configuring, according to the periodic information of the pre-scheduled service, the terminal that is in the narrow bandwidth receiving mode to switch to the system bandwidth or the bandwidth occupied by the pre-scheduled service according to a time interval to receive the pre-scheduled service.

Optionally, the processor 110 is specifically used for: sending a process identification of the pre-scheduled service and first time information of when the terminal switches to the system bandwidth or the bandwidth occupied by the pre-scheduled service, in downlink control information of a physical downlink control channel of the narrow bandwidth. The downlink control information is used for triggering the terminal to switch to the system bandwidth or the bandwidth occupied by the pre-scheduled service; sending second time information of when the terminal returns to the narrow bandwidth receiving mode in the downlink control information, or transmitting a trigger signal for triggering the terminal to return to the narrow bandwidth receiving mode in a preset area of a physical downlink control channel of the system bandwidth; and scheduling the terminal to switch to the system bandwidth or the bandwidth occupied by the pre-scheduled service to receive the pre-scheduled service according to the first time information and the second time information or according to the first time information and the trigger signal.

Optionally, the processor 110 is specifically used for: if the bandwidth occupied by the pre-scheduled service is the system bandwidth, scheduling the terminal to switch to the system bandwidth to receive the pre-scheduled service when the pre-scheduled service needs to be transmitted; if the bandwidth occupied by the pre-scheduled service is part of the system bandwidth, scheduling the terminal to switch to the bandwidth occupied by the pre-scheduled service to receive the pre-scheduled service when the pre-scheduled service needs to be transmitted; or if the bandwidth occupied by the pre-scheduled service is within the narrow bandwidth, when the pre-scheduling service needs to be transmitted, scheduling the terminal to switch to the bandwidth occupied by the pre-scheduled service in a physical downlink control channel of the narrow bandwidth to receive the pre-scheduling service, and indicating a modulation and coding scheme of the pre-scheduling service and a time-frequency domain resource occupied by the pre-scheduling service in the downlink control information of a physical downlink control channel of the narrow bandwidth.

Figure 12:
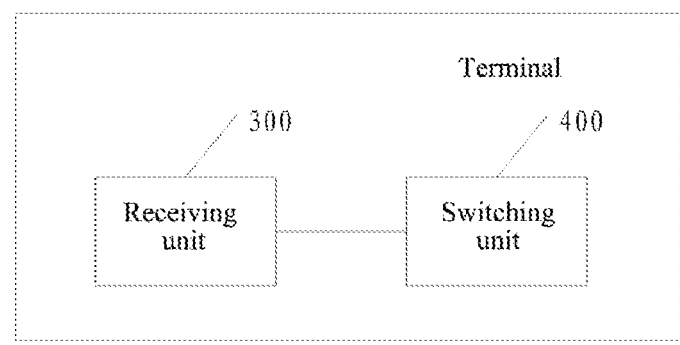
FIG. 12 is a schematic diagram of a second implementation of composition of a terminal according to the present disclosure.

Referring to FIG. 12, FIG. 12 is a schematic diagram of a first implementation of composition of a terminal according to the present disclosure. In this implementation, the terminal includes a receiving unit 300 and a switching unit 400.

The receiving unit 300 is used for receiving a switch message of a narrow bandwidth receiving mode sent by a base station.

The switching unit 400 is used for switching to a designated narrow bandwidth to receive information according to the switch message, wherein a width of the narrow bandwidth is smaller than the width of a system bandwidth.

The switching unit 400 is further used for switching to the system bandwidth or a bandwidth occupied by a pre-scheduled service to receive the pre-scheduled service according to scheduling of the base station when the pre-scheduled service needs to be transmitted.

Optionally, the receiving unit 300 is further used for receiving downlink control information for the terminal in a physical downlink control channel on the narrow bandwidth.

The downlink control information is in a terminal-specific search space corresponding to the terminal, and uses a control channel element aggregation level corresponding to the terminal.

Optionally, the receiving unit 300 is further used for receiving information relevant to the pre-scheduled service sent by the base station before receiving the switch message of the narrow bandwidth receiving mode sent by the base station. The information relevant to the pre-scheduled service includes process identification information of the pre-scheduled service, periodic information of the pre-scheduled service, and information of a resource allocated by the base station for the pre-scheduled service.

Optionally, the receiving unit 300 is specifically used for: receiving information of a time interval during which the terminal is in the narrow bandwidth receiving mode and information of a time interval during which the terminal receives the pre-scheduled service, sent by the base station.

The switching unit 400 is specifically used for: switching to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

Optionally, the receiving unit 300 is specifically used for: receiving a time interval configured by the base station according to the periodic information of the pre-scheduled service.

The switching unit 400 is specifically used for: switching to the system bandwidth or the bandwidth occupied by the pre-scheduled service according to the time interval to receive the pre-scheduled service.

Optionally, the receiving unit 300 is specifically used for: receiving a process identification of the pre-scheduled service and first time information indicating when the terminal switches to the system bandwidth or the bandwidth occupied by the pre-scheduled service, sent by the base station in downlink control information of a physical downlink control channel of the narrow bandwidth, wherein the downlink control information is used for triggering the terminal to switch to the system bandwidth or the bandwidth occupied by the pre-scheduled service; and receiving second time information indicating when the terminal returns to the narrow bandwidth receiving mode, sent by the base station through the downlink control information, or detecting a trigger signal for triggering the terminal to return to the narrow bandwidth receiving mode in a preset area of a physical downlink control channel of the system bandwidth.

The switching unit 400 is specifically used for: switching to the system bandwidth or the bandwidth occupied by the pre-scheduled service to receive the pre-scheduled service according to the first time information and the second time information, or according to the first time information and the trigger signal.

Optionally, if the bandwidth occupied by the pre-scheduled service is the system bandwidth, when the pre-scheduled service needs to be transmitted, the switching unit 400 is specifically used for switching to the system bandwidth to receive the pre-scheduled service.

If the bandwidth occupied by the pre-scheduled service is part of the system bandwidth, when the pre-scheduled service needs to be transmitted, the switching unit 400 is specifically used for switching to the bandwidth occupied by the pre-scheduled service to receive the pre-scheduled service.

If the bandwidth occupied by the pre-scheduled service is within the narrow bandwidth, when the pre-scheduling service needs to be transmitted, the switching unit 400 is specifically used for switching to the bandwidth occupied by the pre-scheduled service to receive the pre-scheduling service, and the receiving unit 300 is further used for receiving a modulation and coding method of the pre-scheduling service and time-frequency domain resources occupied by the pre-scheduling service sent by the base station in the downlink control information of a physical downlink control channel of the narrow bandwidth.

Figure 13:
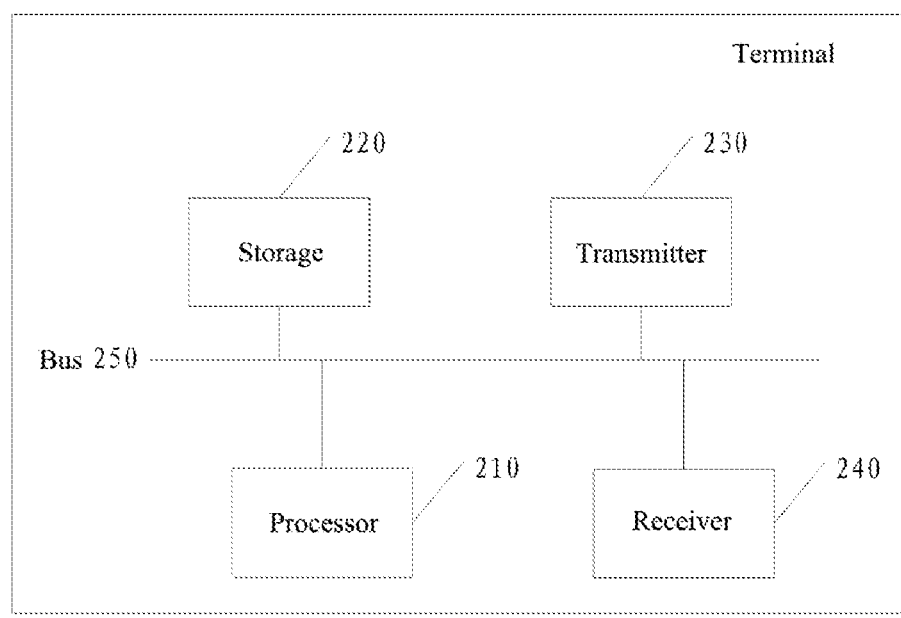
FIG. 13 is a schematic diagram of a second implementation of composition of a terminal according to the present disclosure.

Referring to FIG. 13, FIG. 13 is a schematic diagram of a second implementation of composition of a terminal according to the present disclosure. In this implementation, the terminal includes a processor 210, a storage 220, a transmitter 230, a receiver 240 and a bus 250. The processor 210, the storage 220, the transmitter 230 and the receiver 240 are connected through the bus 250. The transmitter 230 is used for transmitting signals, the receiver 240 is used for receiving signals, and the transmitter 230 and the receiver 240 are independently configured respectively or integrated. The storage 220 is used for storing a set of program codes. The processor 210 is used for calling the set of the program codes stored in the storage 220 to perform the following operations: receiving a switch message of a narrow bandwidth receiving mode sent by a base station through the receiver 240, and switching to a designated narrow bandwidth to receive information, wherein a width of the narrow bandwidth is smaller than the width of a system bandwidth; and switching to the system bandwidth or a bandwidth occupied by a pre-scheduled service to receive the pre-scheduled service according to a scheduling of the base station when the pre-scheduled service needs to be transmitted.

Optionally, the processor 210 is further used for receiving downlink control information for the terminal in a physical downlink control channel on the narrow bandwidth through the receiver 240.

The downlink control information is in a terminal-specific search space corresponding to the terminal, and uses a control channel element aggregation level corresponding to the terminal.

Optionally, the processor 210 is further used for receiving information relevant to the pre-scheduled service sent by the base station through the receiver 240 before receiving the switch message of the narrow bandwidth receiving mode sent by the base station through the receiver 240 and switching to the designated narrow bandwidth to receive information. The information relevant to the pre-scheduled service includes process identification information of the pre-scheduled service, periodic information of the pre-scheduled service, and information of a resource allocated by the base station for the pre-scheduled service.

Optionally, the processor 210 is specifically used for receiving information of a time interval during which the terminal is in the narrow bandwidth receiving mode and information of a time interval during which the terminal receives the pre-scheduled service through the receiver 240, sent by the base station; and switching to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

Optionally, the processor 210 is specifically used for: receiving a time interval configured by the base station through the receiver 240 according to the periodic information of the pre-scheduled service, and switching to the system bandwidth or the bandwidth occupied by the pre-scheduled service according to the time interval to receive the pre-scheduled service.

Optionally, the processor 210 is specifically used for: receiving, through the receiver 240, a process identification of the pre-scheduled service and first time information indicating when the terminal switches to the system bandwidth or the bandwidth occupied by the pre-scheduled service, sent by the base station in downlink control information of a physical downlink control channel of the narrow bandwidth, wherein the downlink control information is used for triggering the terminal to switch to the system bandwidth or the bandwidth occupied by the pre-scheduled service; receiving, through the receiver 240, second time information indicating when the terminal returns to the narrow bandwidth receiving mode, sent by the base station through the downlink control information, or detecting a trigger signal for triggering the terminal to return to the narrow bandwidth receiving mode in a preset area of a physical downlink control channel of the system bandwidth; and switching to the system bandwidth or the bandwidth occupied by the pre-scheduled service to receive the pre-scheduled service according to the first time information and the second time information, or according to the first time information and the trigger signal.

Optionally, if the bandwidth occupied by the pre-scheduled service is the system bandwidth, when the pre-scheduled service needs to be transmitted, the processor 210 is specifically used for switching to the system bandwidth to receive the pre-scheduled service.

If the bandwidth occupied by the pre-scheduled service is part of the system bandwidth, when the pre-scheduled service needs to be transmitted, the processor 210 is specifically used for switching to the bandwidth occupied by the pre-scheduled service to receive the pre-scheduled service.

If the bandwidth occupied by the pre-scheduled service is within the narrow bandwidth, when the pre-scheduling service needs to be transmitted, the processor 210 is specifically used for switching to the bandwidth occupied by the pre-scheduled service to receive the pre-scheduling service, and receiving a modulation and coding scheme of the pre-scheduling service and a time-frequency domain resource occupied by the pre-scheduling service sent by the base station through the receiver 240 in the downlink control information of a physical downlink control channel of the narrow bandwidth.

The base station described in the implementation may be used for implementing some or all of the processes in the method implementations described in connection with FIGS. 2-6 of the present disclosure, and performing some or all of the functions in the device implementations described in connection with FIG. 10 of the present disclosure. The terminal described in the implementation may be used for implementing some or all of the processes in the method implementations described in connection with FIGS. 7-9 of the present disclosure, and performing some or all of the functions in the device implementations described in connection with FIG. 12 of the present disclosure. Those will not be repeated here.

In one or more examples, the described functions may be implemented through hardware, software, firmware, or any combination thereof. If implemented through software, the functions may be stored in a computer-readable medium or transmitted via the computer readable medium as one or more instructions or codes, and the functions may be executed by a hardware-based processing unit. The computer-readable medium may include a computer-readable storage medium (which corresponds to a tangible medium such as a data storage medium) or a communication medium including, for example, any medium that facilitates transfer of a computer program from one place to another place according to a communication protocol. In such way, the computer-readable medium may generally correspond to (1) a non-transitory tangible computer-readable storage medium, or (2) a communication medium such as a signal or a carrier wave. The data storage medium may be any available medium accessible by one or more computers or one or more processors to retrieve instructions, codes, and/or data structures for implementing the techniques described in the present disclosure. The computer program product may include a computer-readable medium.

By an example which is not used for limitation, some computer readable storage media may include a RAM, a ROM, an EEPROM, a CD-ROM or any other optical disk memory or magnetic disk memory, or any other magnetic storage device or flash memory, or any other medium that may be used to store desired program codes in the form of instructions or data structures and may be accessed by the computer. Moreover, any connection may be appropriately referred to as a computer readable medium. For example, if instructions are sent from a website, a server, or other remote source by using a coaxial cable, an optical cable, a twisted pair, a digital subscriber line (DSL), or wireless technologies (e.g., an infrared ray, radio, and a microwave), then the coaxial cable, the optical cable, the twisted pair, the DSL, or the wireless technologies (e.g., the infrared ray, the radio, and the microwave) are included in the definition of medium. However, it should be understood that the computer readable storage medium and data storage medium do not include a connection, a carrier, a signal, or any other transitory medium, but include a medium related to the non-transitory tangible storage medium. As used herein, the magnetic disk and optical disk include a compact disk (CD), a laser disk, an optical disk, a digital video disk (DVD), a floppy disk, and a blue-ray disk, where the magnetic disk usually copies data magnetically, while the optical disk copies data optically by the laser. Combinations of the above should further be included within the scope of the computer readable medium.

The indications may be executed by one or more processors such as one or more digital signal processors (DSP), general purpose microprocessors, application specific integrated circuits (ASIC), field programmable logic arrays (FPGA) or other equivalent integrated or discrete logic circuits. Thus, the term "processor" as used herein may refer to any of the foregoing structures or any other structure suitable for implementing the techniques described herein. In addition, in some aspects, the functionality described herein may be provided within dedicated hardware and/or software modules configured for encoding and decoding, or incorporated into a combined codec. Moreover, the techniques may be fully implemented in one or more circuits or logic elements.

The techniques of the present disclosure may be widely implemented by a variety of apparatuses or devices including wireless handsets, integrated circuits (IC) or IC sets (e.g., chipsets). Various components, modules or units are described in the present disclosure to emphasize functional aspects of devices configured to perform the disclosed techniques, but are not necessarily required to be implemented by different hardware units. Specifically, as described above, various units may be combined in codec hardware units, or provided by a collection of interactive and operable hardware units (including one or more processors as described above) in combination with suitable software and/or firmware.

It should be understood that the "one implementation" or "an implementation" in the specification means that particular features, structures, or characteristics related to the implementations of the present disclosure may be included in at least one implementation of the present disclosure. Thus, "in one implementation" or "in an implementation" in the specification may not definitely refer to the same implementation. In addition, these specific features, structures, or characteristics may be combined in one or more implementations in any suitable manner.

It should be understood that, in various implementations of the present disclosure, the values of the sequence numbers of the above-described processes do not imply the order of execution, and the order of execution of each process should be determined by its function and inherent logic, without constituting any limitation to the implementation process of the implementations of the present disclosure.

In addition, the terms "system" and "network" are often used interchangeably herein. The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

In the implementations provided in the present application, it should be understood that "B corresponding to A" means that B is associated with A, and B can be determined according to A. However, it should be further understood that determining B according to A does not mean B is determined according to A only, but B may be determined according to A and/or other information.

Those of ordinary skill in the art will recognize that the exemplary elements and algorithm acts described in connection with the implementations disclosed herein can be implemented in electronic hardware, or a combination of computer software and electronic hardware. In order to explain interchangeability of software and hardware clearly, the composition of the examples and the acts in the examples are described generally with respect to functions in the above description. Whether these functions are implemented in hardware or software depends on the specific application and design constraints of the technical solution. Skilled in the art may use different methods to realize the described functions for each particular application, but such realization should not be considered to be beyond the scope of the present disclosure.

Those skilled in the art can clearly understand that for convenience and conciseness of description, the specific working processes of the system, device and unit described above may refer to the corresponding processes in the aforementioned method implementations and will not be described here.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The unit described as a separate unit may or may not be physically separated, and the component shown as a unit may or may not be a physical unit, i.e., it may be located in one place or may be distributed over multiple network units. Some or all of the elements can be selected according to actual needs to achieve the purpose of the implementations.

In addition, various functional units in various implementations of the present disclosure may be integrated in one processing unit, or the various functional units may be physically present separately, or two or more units may be integrated in one unit.

What are described above are merely exemplary implementations of the present disclosure, but the protection scope of the present disclosure is not limited thereto. Any person skilled in the art may easily conceive changes or substitutions within the technical scope disclosed by the present disclosure, which should be included within the protection scope of the present disclosure. Therefore, the protection scope of the present disclosure should be determined by the scope of the appended claims.

What is claimed is:

1. A method for transmitting a service, comprising:
    sending, to a terminal, information relevant to a pre-scheduled service to the terminal, wherein the information relevant to the pre-scheduled service comprises at least one of process identification information of the pre-scheduled service or periodic information of the pre-scheduled service;
    sending, by a base station, to the terminal a switch message of a narrow bandwidth receiving mode, indicating the terminal to switch to a designated narrow bandwidth to receive information, wherein a width of the narrow bandwidth is smaller than a width of a system bandwidth; and
    scheduling, by the base station, the terminal to switch to the system bandwidth or a bandwidth occupied by the pre-scheduled service to receive the pre-scheduled service when the pre-scheduled service needs to be transmitted, comprising:
        configuring, by the base station, information of a time interval during which the terminal is in the narrow bandwidth receiving mode and information of a time interval during which the terminal receives the pre-scheduled service, and sending to the terminal the information of the time interval during which the terminal is in the narrow bandwidth receiving mode and the information of the time interval during which the terminal receives the pre-scheduled service; and
        scheduling, according to the information of the time interval during which the terminal is in the narrow bandwidth receiving mode and the information of the time interval during which the terminal receives the pre-scheduled service, the terminal to switch to the system bandwidth or the bandwidth occupied by the pre-scheduled service to receive the pre-scheduled service when the pre-scheduled service needs to be transmitted.

2. The method of claim 1, wherein the method further comprises:
    sending downlink control information for the terminal in a physical downlink control channel on the narrow bandwidth, wherein the downlink control information is in a terminal-specific search space corresponding to the terminal, and uses a control channel element aggregation level corresponding to the terminal.

3. The method of claim 1, wherein:
    when the bandwidth occupied by the pre-scheduled service is the system bandwidth, the base station schedules the terminal to switch to the system bandwidth to receive the pre-scheduled service when the pre-scheduled service needs to be transmitted;
    when the bandwidth occupied by the pre-scheduled service is part of the system bandwidth, the base station schedules the terminal to switch to the bandwidth occupied by the pre-scheduled service to receive the pre-scheduled service when the pre-scheduled service needs to be transmitted; and
    when the bandwidth occupied by the pre-scheduled service is within the narrow bandwidth, when the pre-scheduled service needs to be transmitted, the base station schedules the terminal to switch to the bandwidth occupied by the pre-scheduled service in a physical downlink control channel of the narrow bandwidth to receive the pre-scheduled service, and indicates a modulation and coding scheme of the pre-scheduled service and a time-frequency domain resource occupied by the pre-scheduled service in downlink control information of the physical downlink control channel of the narrow bandwidth.

4. A method for transmitting a service, comprising:
receiving information relevant to a pre-scheduled service sent by a base station, wherein the information relevant to the pre-scheduled service comprises at least one of process identification information of the pre-scheduled service or periodic information of the pre-scheduled service;
receiving, by a terminal, a switch message of a narrow bandwidth receiving mode sent by the base station, and switching to a designated narrow bandwidth to receive information, wherein a width of the narrow bandwidth is smaller than a width of a system bandwidth; and
switching, by the terminal, to the system bandwidth or a bandwidth occupied by the pre-scheduled service to receive the pre-scheduled service according to scheduling of the base station when the pre-scheduled service needs to be transmitted, comprising:
receiving information of a time interval during which the terminal is in the narrow bandwidth receiving mode and information of a time interval during which the terminal receives the pre-scheduled service, sent by the base station; and
switching to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

5. The method of claim 4, wherein the method further comprises:
receiving downlink control information for the terminal in a physical downlink control channel on the narrow bandwidth,
wherein the downlink control information is in a terminal-specific search space corresponding to the terminal, and uses a control channel element aggregation level corresponding to the terminal.

6. The method of claim 4, wherein when the bandwidth occupied by the pre-scheduled service is the system bandwidth, the terminal switches to the system bandwidth to receive the pre-scheduled service when the pre-scheduled service needs to be transmitted;
when the bandwidth occupied by the pre-scheduled service is part of the system bandwidth, the terminal switches to the bandwidth occupied by the pre-scheduled service to receive the pre-scheduled service when the pre-scheduled service needs to be transmitted; and
when the bandwidth occupied by the pre-scheduled service is within the narrow bandwidth, when the pre-scheduled service needs to be transmitted, the terminal switches to the bandwidth occupied by the pre-scheduled service to receive the pre-scheduled service, and receives a modulation and coding scheme of the pre-scheduled service and a time-frequency domain resource occupied by the pre-scheduled service sent by the base station in downlink control information of a physical downlink control channel of the narrow bandwidth.

7. A base station, comprising:
a processor, a storage, a transceiver and a bus, wherein the processor, the storage and the transceiver are connected through the bus, the transceiver is used for receiving and transmitting signals to communicate with a terminal, the storage is used for storing a set of program codes, and the processor is used for calling the set of the program codes stored in the storage to perform following operations:
sending information relevant to a pre-scheduled service to the terminal through the transceiver, wherein the information relevant to the pre-scheduled service comprises at least one of process identification information of the pre-scheduled service or periodic information of the pre-scheduled service;
sending a switch message of a narrow bandwidth receiving mode to a terminal through the transceiver, indicating the terminal to switch to a designated narrow bandwidth to receive information, wherein a width of the narrow bandwidth is smaller than a width of a system bandwidth;
configuring information of a time interval during which the terminal is in the narrow bandwidth receiving mode and information of a time interval during which the terminal receives the pre-scheduled service, and sending the information of the time interval during which the terminal is in the narrow bandwidth receiving mode and the information of the time interval during which the terminal receives the pre-scheduled service to the terminal; and
scheduling the terminal to switch to the system bandwidth or a bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

8. The base station of claim 7, wherein the processor is further used for sending downlink control information for the terminal through the transceiver in a physical downlink control channel on the narrow bandwidth; and
the downlink control information is in a terminal-specific search space corresponding to the terminal, and uses a control channel element aggregation level corresponding to the terminal.

9. The base station of claim 7, wherein the processor is further used for sending information relevant to the pre-scheduled service to the terminal through the transceiver before sending the switch message of the narrow bandwidth receiving mode to the terminal through the transceiver, indicating the terminal to switch to the designated narrow bandwidth to receive information, wherein the information relevant to the pre-scheduled service comprises process identification information of the pre-scheduled service, periodic information of the pre-scheduled service, and information of a resource allocated by the base station for the pre-scheduled service.

10. The base station of claim 9, wherein the processor is further used for:
configuring information of a time interval during which the terminal is in the narrow bandwidth receiving mode and information of a time interval during which the terminal receives the pre-scheduled service, and sending the information of the time interval during which the terminal is in the narrow bandwidth receiving mode and the information of the time interval during which the terminal receives the pre-scheduled service to the terminal; and scheduling the terminal to switch to the system bandwidth or the bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

11. The base station of claim 7, wherein the processor is further used for:
configuring, according to the periodic information of the pre-scheduled service, the terminal that is in the narrow bandwidth receiving mode to switch to the system bandwidth or the bandwidth occupied by the pre-scheduled service according to a time interval to receive the pre-scheduled service.

12. The base station of claim 7, wherein the processor is further used for:
sending a process identification of the pre-scheduled service and first time information of when the terminal switches to the system bandwidth or the bandwidth occupied by the pre-scheduled service, in downlink control information of a physical downlink control channel of the narrow bandwidth, wherein the downlink control information is used for triggering the terminal to switch to the system bandwidth or the bandwidth occupied by the pre-scheduled service;
sending second time information of when the terminal returns to the narrow bandwidth receiving mode, in the downlink control information, or transmitting a trigger signal for triggering the terminal to return to the narrow bandwidth receiving mode in a preset area of a physical downlink control channel of the system bandwidth; and
scheduling the terminal to switch to the system bandwidth or the bandwidth occupied by the pre-scheduled service to receive the pre-scheduled service according to the first time information and the second time information, or according to the first time information and the trigger signal.

13. The base station of claim 7, wherein the processor is further used for:
when the bandwidth occupied by the pre-scheduled service is the system bandwidth, scheduling the terminal to switch to the system bandwidth to receive the pre-scheduled service when the pre-scheduled service needs to be transmitted;
when the bandwidth occupied by the pre-scheduled service is part of the system bandwidth, scheduling the terminal to switch to the bandwidth occupied by the pre-scheduled service to receive the pre-scheduled service when the pre-scheduled service needs to be transmitted; and
when the bandwidth occupied by the pre-scheduled service is within the narrow bandwidth, scheduling the terminal to switch to the bandwidth occupied by the pre-scheduled service in a physical downlink control channel of the narrow bandwidth to receive the pre-scheduled service when the pre-scheduled service needs to be transmitted, and indicating a modulation and coding scheme of the pre-scheduled service and a time-frequency domain resource occupied by the pre-scheduled service in downlink control information of the physical downlink control channel of the narrow bandwidth.

14. A terminal, comprising:
a processor, a storage, a transmitter, a receiver and a bus, wherein the processor, the storage, the transmitter and the receiver are connected through the bus, wherein the transmitter is used for transmitting signals, the receiver is used for receiving signals, the transmitter and the receiver are independently configured respectively or integrated, the storage is used for storing a set of program codes, and the processor is used for calling the set of the program codes stored in the storage to perform following operations:
receiving information relevant to a pre-scheduled service sent by a base station through the receiver, wherein the information relevant to the pre-scheduled service includes at least one of process identification information of the pre-scheduled service or periodic information of the pre-scheduled service;
receiving a switch message of a narrow bandwidth receiving mode sent by the base station through the receiver, and switching to a designated narrow bandwidth to receive information, wherein a width of the narrow bandwidth is smaller than a width of a system bandwidth;
receiving information of a time interval during which the terminal is in the narrow bandwidth receiving mode and information of a time interval during which the terminal receives the pre-scheduled service sent by the base station through the receiver; and
switching to the system bandwidth or a bandwidth occupied by the pre-scheduled service to receive the pre-scheduled service according to the information of the time interval during which the terminal is in the narrow bandwidth receiving mode and the information of the time interval during which the terminal receives the pre-scheduled service when the pre-scheduled service needs to be transmitted.

15. The terminal of claim 14, wherein the processor is further used for receiving downlink control information for the terminal through the receiver in a physical downlink control channel on the narrow bandwidth; and
the downlink control information is in a terminal-specific search space corresponding to the terminal, and uses a control channel element aggregation level corresponding to the terminal.

16. The terminal of claim 14, wherein the processor is further used for:
receiving through the receiver a time interval configured by the base station according to the periodic information of the pre-scheduled service, and switching to the system bandwidth or the bandwidth occupied by the pre-scheduled service according to the time interval to receive the pre-scheduled service.

17. The terminal of claim 14, wherein the processor is further used for:
receiving, through the receiver, a process identification of the pre-scheduled service and first time information indicating when the terminal switches to the system bandwidth or the bandwidth occupied by the pre-scheduled service, sent by the base station in downlink control information of a physical downlink control channel of the narrow bandwidth, wherein the downlink control information is used for triggering the terminal to switch to the system bandwidth or the bandwidth occupied by the pre-scheduled service;
receiving, through the receiver, second time information indicating when the terminal returns to the narrow bandwidth receiving mode, sent by the base station through the downlink control information, or detecting a trigger signal for triggering the terminal to return to the narrow bandwidth receiving mode in a preset area of a physical downlink control channel of the system bandwidth; and switching to the system bandwidth or the bandwidth occupied by the pre-scheduled service to receive the pre-scheduled service according to the first time information and the second time information or according to the first time information and the trigger signal.

18. The terminal of claim 14, wherein when the bandwidth occupied by the pre-scheduled service is the system bandwidth, the processor is specifically used for switching to the system bandwidth to receive the pre-scheduled service when the pre-scheduled service needs to be transmitted;

when the bandwidth occupied by the pre-scheduled service is part of the system bandwidth, the processor is specifically used for switching to the bandwidth occupied by the pre-scheduled service to receive the pre-scheduled service when the pre-scheduled service needs to be transmitted; and when the bandwidth occupied by the pre-scheduled service is within the narrow bandwidth, the processor is specifically used for switching to the bandwidth occupied by the pre-scheduled service to receive the pre-scheduled service when the pre-scheduled service needs to be transmitted, and receiving a modulation and coding scheme of the pre-scheduled service and a time-frequency domain resource occupied by the pre-scheduled service sent by the base station through the receiver in downlink control information of a physical downlink control channel of the narrow bandwidth.

* * * * *